United States Patent
Takahashi et al.

(10) Patent No.: US 9,918,058 B2
(45) Date of Patent: Mar. 13, 2018

(54) INFORMATION PROCESSING TO ALLOW PROJECTOR UNITS TO PROJECT IMAGES IN COOPERATION

(71) Applicant: SONY CORPORATION, Tokyo (JP)

(72) Inventors: Naomasa Takahashi, Chiba (JP); Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/319,085

(22) PCT Filed: Jun. 17, 2015

(86) PCT No.: PCT/JP2015/067424
§ 371 (c)(1),
(2) Date: Dec. 15, 2016

(87) PCT Pub. No.: WO2016/002512
PCT Pub. Date: Jan. 7, 2016

(65) Prior Publication Data
US 2017/0127032 A1    May 4, 2017

(30) Foreign Application Priority Data

Jul. 1, 2014    (JP) .................. 2014-135793

(51) Int. Cl.
*H04N 3/22* (2006.01)
*H04N 9/31* (2006.01)
(Continued)

(52) U.S. Cl.
CPC ........... *H04N 9/3188* (2013.01); *G09G 3/001* (2013.01); *G09G 3/2003* (2013.01); *H04N 5/225* (2013.01);
(Continued)

(58) Field of Classification Search
CPC .... H04N 9/3188; H04N 5/225; H04N 9/3182; H04N 9/3185; G09G 3/001; G09G 3/2003; G09G 2300/026; G09G 2326/0666
(Continued)

(56) References Cited

U.S. PATENT DOCUMENTS

| 2004/0184011 A1* | 9/2004 | Raskar | G03B 21/26 353/94 |
| 2012/0050698 A1* | 3/2012 | Kotani | G03B 21/14 353/94 |
| 2013/0176351 A1* | 7/2013 | Abele | G09G 3/3406 345/690 |

FOREIGN PATENT DOCUMENTS

| JP | 2006-114948 A | 4/2006 |
| JP | 2008-249906 A | 10/2008 |

(Continued)

OTHER PUBLICATIONS

Raskar, et al., "iLamps: Geometrically Aware and Self-Configuring Projectors", ACM SIGGRAPH 2003 Conference Proceedings, Jul. 27-31, 2003, pp. 1-10.

*Primary Examiner* — Michael Lee
(74) *Attorney, Agent, or Firm* — Chip Law Group

(57) ABSTRACT

The present technology relates to an information processing apparatus and method that allow a plurality of projection units to project images more easily in cooperation. The information processing apparatus of the present technology forms a group for projecting one contents data in cooperation with other information processing apparatuses including projection units to project images and imaging units to shoot a subject and obtain shot images, shares correction information as information relating to correction made to images projected by the projection units of the information processing apparatuses belonging to the formed group among the information processing apparatuses belonging to the formed group, and updates the correction information for the subject information processing apparatus on the basis of the shot image obtained by shooting the image projected by the projection unit as a subject and the shared correction information. The present technology is applicable to projectors or cameras, or electronic devices including the both (Continued)

functions of projector and camera, computers controlling these devices, and others, for example.

21 Claims, 30 Drawing Sheets

(51) Int. Cl.
 *G09G 3/00* (2006.01)
 *G09G 3/20* (2006.01)
 *H04N 5/225* (2006.01)
(52) U.S. Cl.
 CPC ......... *H04N 9/3182* (2013.01); *H04N 9/3185* (2013.01); *G09G 2300/026* (2013.01); *G09G 2320/0666* (2013.01)
(58) Field of Classification Search
 USPC ........................................................ 348/745
 See application file for complete search history.

(56) References Cited

FOREIGN PATENT DOCUMENTS

| | | |
|---|---|---|
| JP | 2012-027154 A | 2/2012 |
| JP | 2012-517621 A | 8/2012 |

\* cited by examiner

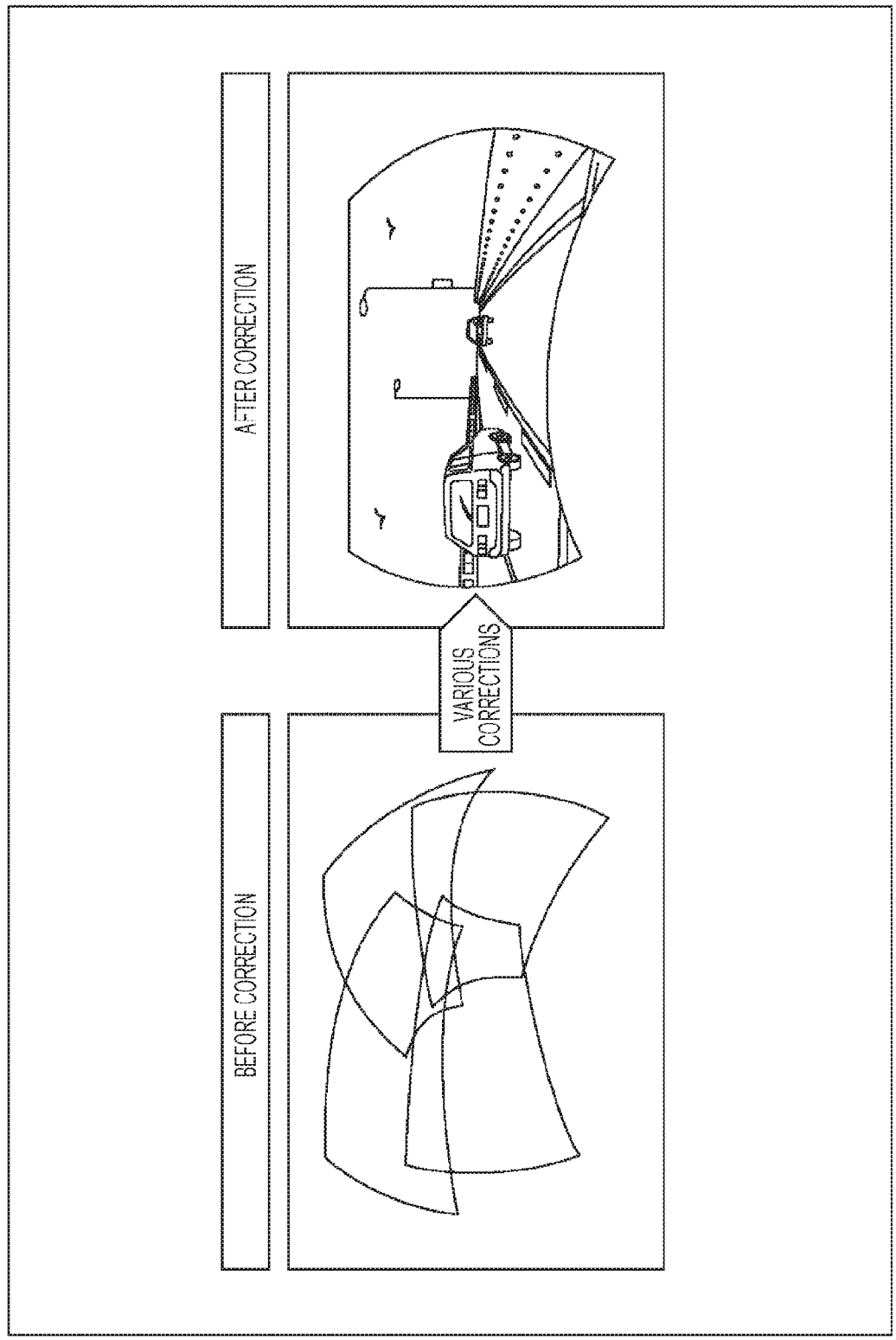

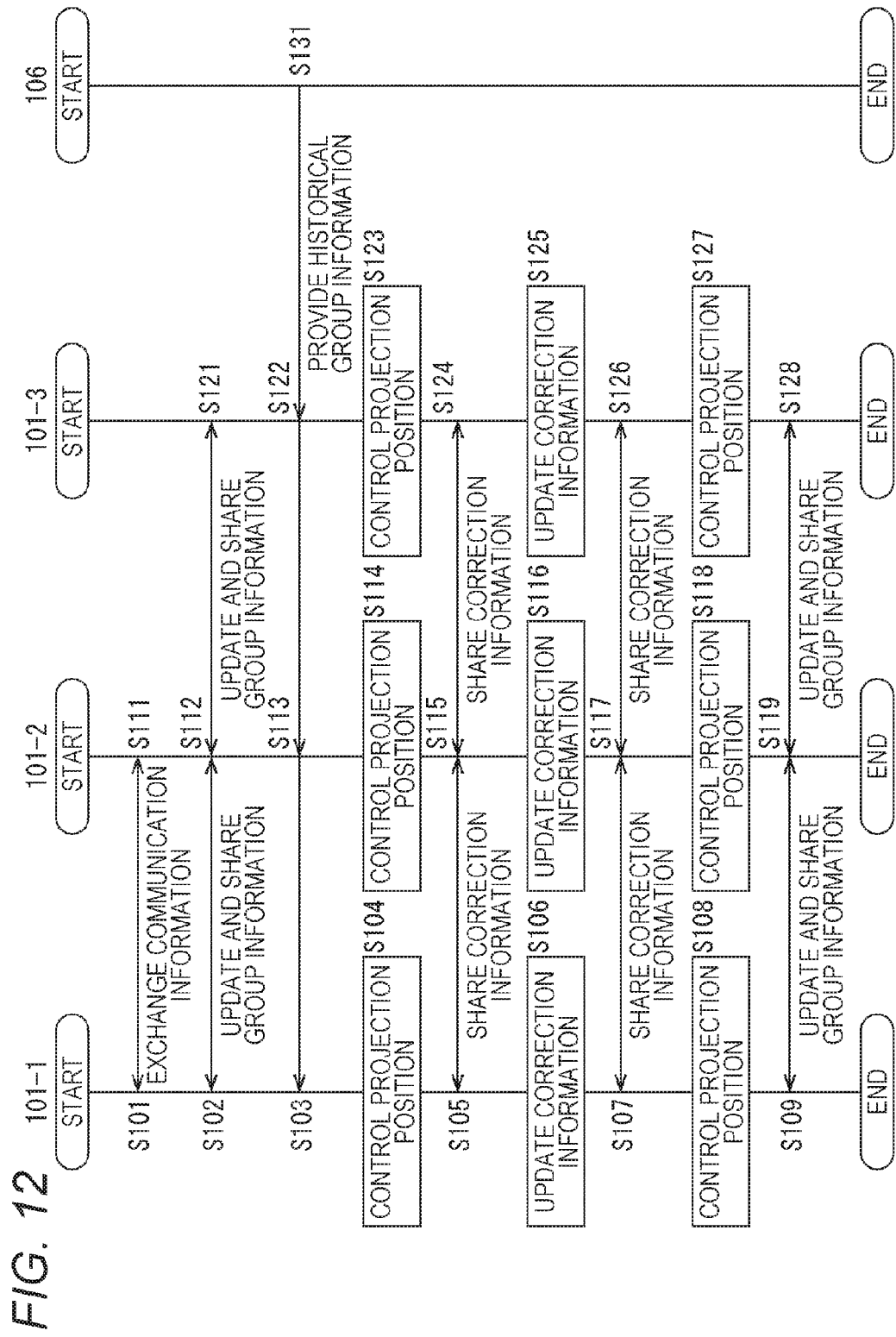

FIG. 13

| GROUP ID | APPARATUS/CORRECTION INFORMATION | KIND OF CONTENTS | LAYOUT OF PROJECTION SCREENS | PROJECTION PLANE |
|---|---|---|---|---|
| ABC012 | APPARATUS 1: CORRECTION INFORMATION 1<br>APPARATUS 2: CORRECTION INFORMATION 2<br>APPARATUS 3: CORRECTION INFORMATION 3<br>APPARATUS 4: CORRECTION INFORMATION 4 | MOVIE | FOUR SCREENS | WHITE/PLANE/WITH ASPERITIES |
| D3E4F5 | APPARATUS 1: CORRECTION INFORMATION 1<br>APPARATUS 2: CORRECTION INFORMATION 2<br>APPARATUS 3: CORRECTION INFORMATION 3<br>APPARATUS 4: CORRECTION INFORMATION 4 | SPORTS | THREE SCREENS + ONE SCREEN | BLACK/PLANE/ANGLED<br>WHITE/SPHERICAL |
| G67HJ8 | APPARATUS 1: CORRECTION INFORMATION 1<br>APPARATUS 2: CORRECTION INFORMATION 2<br>APPARATUS 3: CORRECTION INFORMATION 3<br>APPARATUS 4: CORRECTION INFORMATION 4 | GAME | TWO SCREENS + TWO SCREENS | RED/CURVED<br>BLUE/CYLINDRICAL/DEPTH |

FIG. 16

| PARAMETER | DESCRIPTION |
|---|---|
| Pj_No | NUMBER FOR TARGET PROJECTION UNIT |
| x_org | X COORDINATE OF TARGET POINT |
| y_org | Y COORDINATE OF TARGET POINT |
| x_dest | X COORDINATE OF TARGET POINT AFTER CONVERSION |
| y_dest | Y COORDINATE OF TARGET POINT AFTER CONVERSION |
| R_Gain | GAIN VALUE OF RED OF TARGET POINT |
| G_Gain | GAIN VALUE OF GREEN OF TARGET POINT |
| B_Gain | GAIN VALUE OF BLUE OF TARGET POINT |
| R_Shift | SHIFT VALUE OF RED OF TARGET POINT |
| G_Shift | SHIFT VALUE OF GREEN OF TARGET POINT |
| B_Shift | SHIFT VALUE OF BLUE OF TARGET POINT |
| RGB Matrix | COEFFICIENT OF COLOR CONVERSION MATRIX OF TARGET POINT (3x3) |

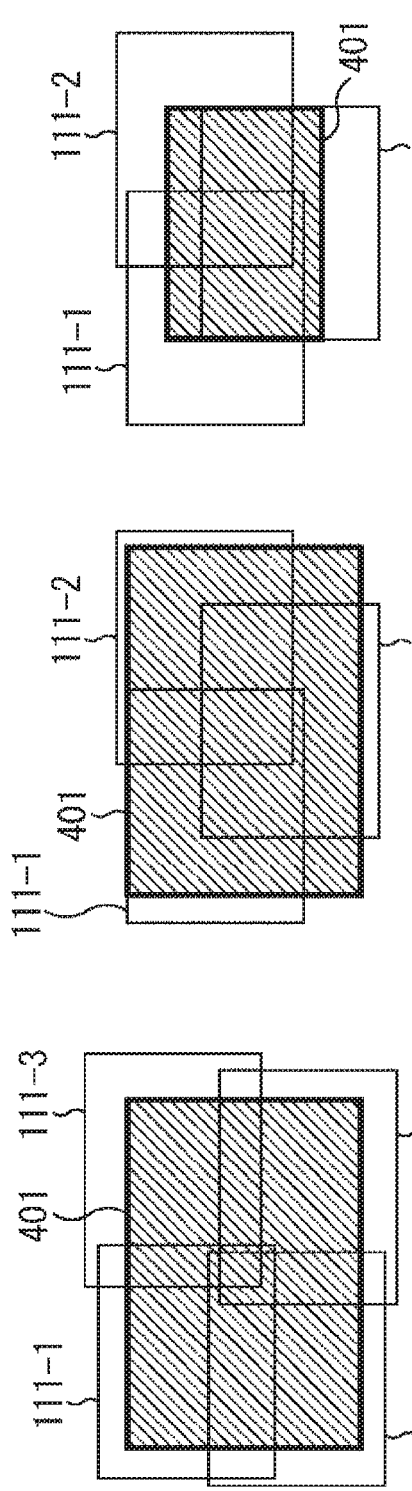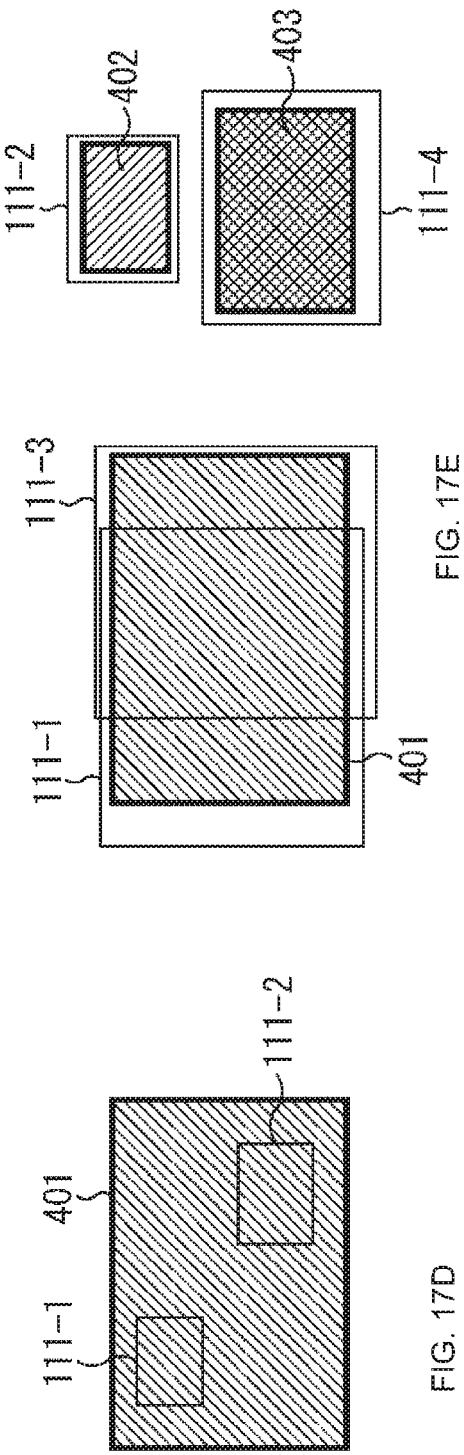

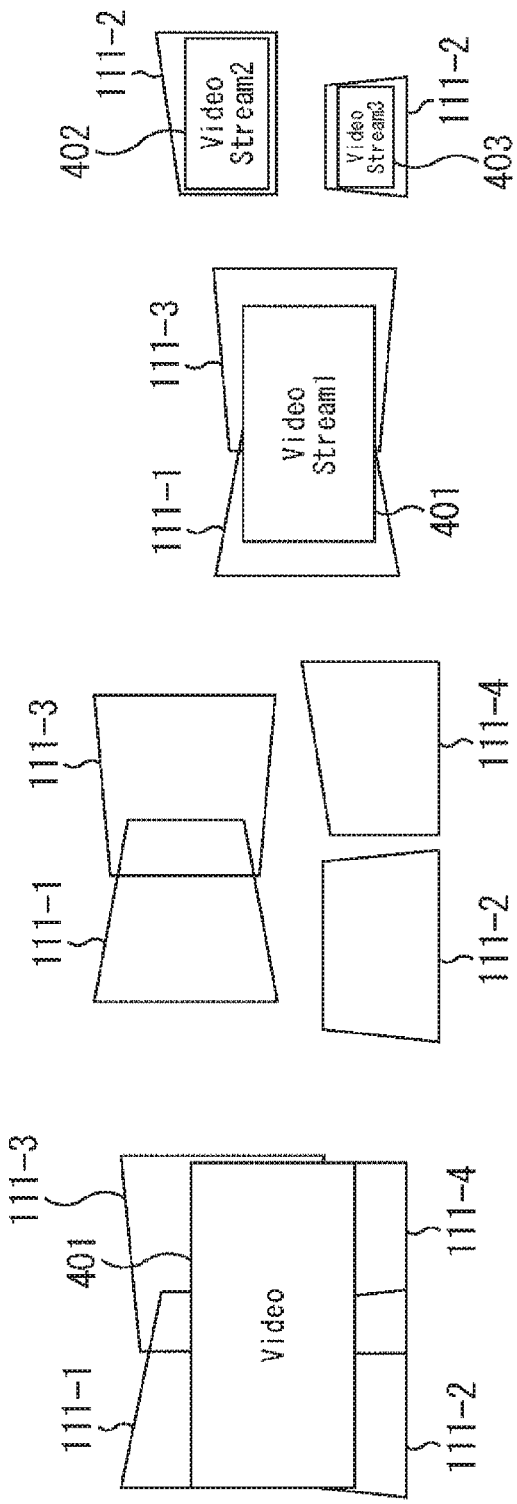

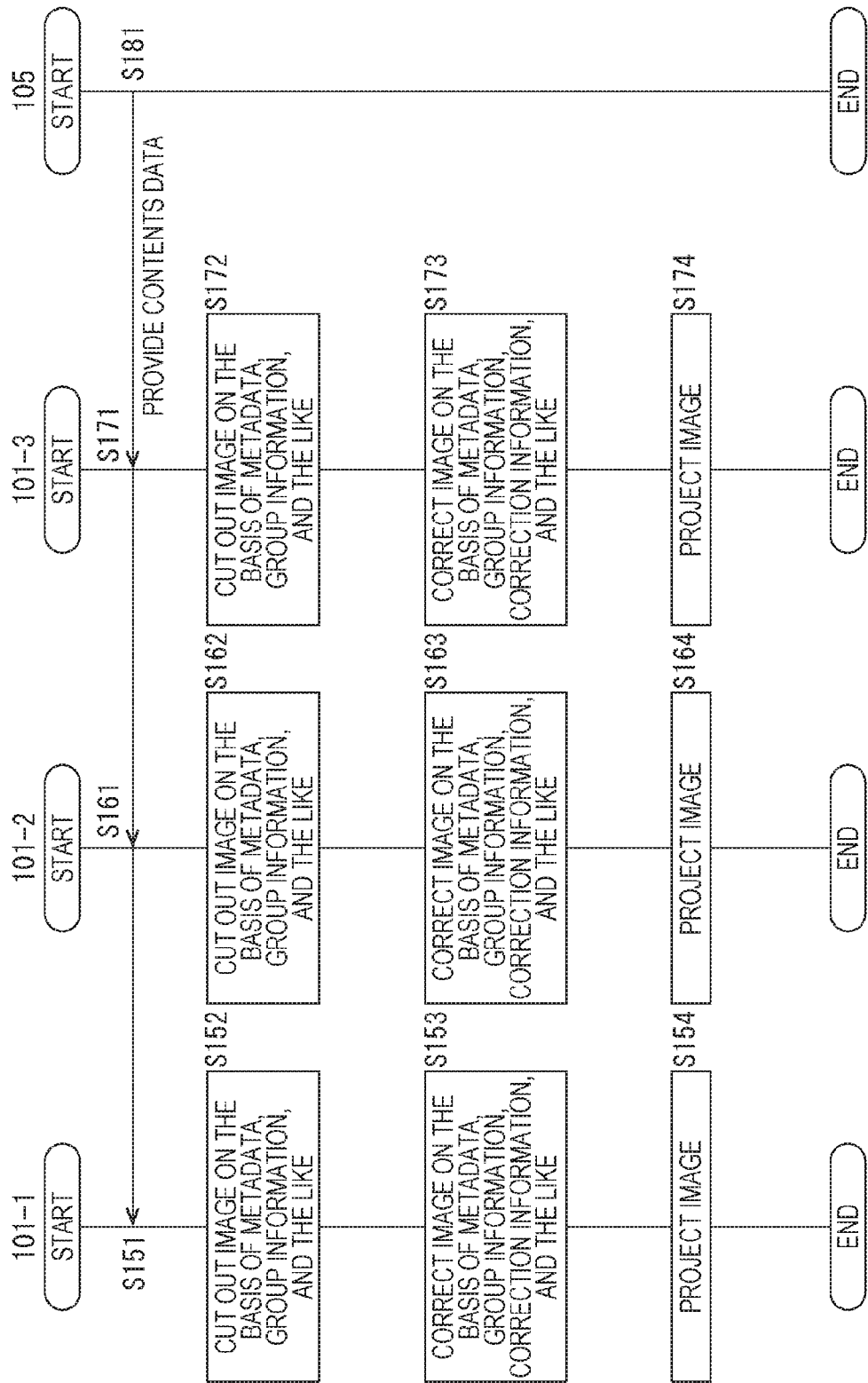

FIG. 22

WATCHING SOCCER GAMES

| | CONTENTS | GENRE | RECOMMENDED SIZE | TYPE | SIZE |
|---|---|---|---|---|---|
| Stream1 | ○○ RELAY BROADCASTING ×× vs △△ | SPORTS/ SOCCER | LARGE | DOWN SHOT | 4k |
| Stream2 | ○○ RELAY BROADCASTING ×× vs △△ | SPORTS/ SOCCER | MEDIUM | CLOSE-UP | Full HD |
| Stream3 | ○○ RELAY BROADCASTING ×× vs △△ | SPORTS/ SOCCER | SMALL | PLAYER DATA | HD |

PLAYING GAMES

| | CONTENTS | GENRE | RECOMMENDED SIZE | TYPE | SIZE |
|---|---|---|---|---|---|
| Stream1 | ○○ DRIVE GAME | SPORTS/ CAR RACE | LARGE | WATCHING RACE | Full HD |
| Stream2 | ○○ DRIVE GAME | SPORTS/ CAR RACE | MEDIUM | DRIVER 1 | HD |
| Stream3 | ○○ DRIVE GAME | SPORTS/ CAR RACE | MEDIUM | DRIVER 2 | HD | ered.
INFORMATION PROCESSING TO ALLOW PROJECTOR UNITS TO PROJECT IMAGES IN COOPERATION

CROSS REFERENCE TO RELATED APPLICATIONS

This application is a U. S. National Phase of International Patent Application No. PCT/JP2015/067424 filed on Jun. 17, 2015, which claims priority benefit of Japanese Patent Application No. JP 2014-135793 filed in the Japan Patent Office on Jul. 1, 2014. Each of the above-referenced applications is hereby incorporated herein by reference in its entirety.

TECHNICAL FIELD

The present technology relates to an information processing apparatus and method, particularly to an information processing apparatus and method that allow a plurality of projection units to project images more easily in cooperation.

BACKGROUND ART

Conventionally, there have been systems that use a plurality of projectors to project images (for example, refer to Non-Patent Document 1). In such systems, the plurality of projectors connected to a computer is controlled and driven by the computer to cooperate with one another and project one or more images. That is, the computer causes the plurality of projectors to cooperate with one another.

CITATION LIST

Non-Patent Document

Non-Patent Document 1: Ramesh Raskar, Jeroen van Baar, Paul Beardsley, Thomas Willwacher, Srinivas Rao, Clifton Forlines, "iLamps: Geometrically Aware and Self-Configuring Projectors," ACM SIGGRAPH 2003 Conference Proceedings

SUMMARY OF THE INVENTION

Problems to be Solved by the Invention

However, this method requires, besides the projectors, the computer for controlling, a camera for sensing, complicated programs for executing system operations, operators with technical knowledge, and others. It suits expensive and large-scaled systems but does not suit simple and less expensive systems that general users without expertise can enjoy casually.

The present technology is proposed in light of the foregoing circumstances, and an object of the present technology is to allow a plurality of projection units to project images more easily in cooperation.

Solutions to Problems

One aspect of the present technology is an information processing apparatus including: a group formation unit that forms a group for projecting one contents data in cooperation with other information processing apparatuses including projection units to project images and imaging units to shoot a subject and obtain shot images; a correction information sharing unit that shares correction information as information relating to correction made to the images projected by the projection units of the information processing apparatuses belonging to the group formed by the group formation unit among the information processing apparatuses belonging to the group formed by the group formation unit; and a correction information updating unit that updates the correction information for the subject information processing apparatus on the basis of the shot image obtained by shooting the image projected by the projection unit as a subject and the correction information shared by the correction information sharing unit.

The correction information may include information relating to correction made to predetermined representative pixels in the image.

The information relating to correction made to the representative pixels may include coordinates before and after the correction of the representative pixels, the gain and shift values of respective color components of the representative pixels, and a coefficient of color conversion matrix of the representative pixels.

The information processing apparatus may further include a wireless communication unit that performs wireless communications, and the group formation unit may form the group including other information processing apparatuses with which wireless communications were performed by the wireless communication unit and the subject information processing apparatus.

The group formation unit may form the group including other information processing apparatuses connected to the subject information processing apparatus via predetermined communication cables and the subject information processing apparatus.

The group formation unit may generate group information as information relating to the formed group.

The group information may include identification information for identifying the group and the correction information for the information processing apparatuses constituting the group corresponding to the group information.

The group information may further include information relating to the kinds of contents data that were projected by the group in the past.

The group information may further include the layout of the images projected by the projection units of the information processing apparatuses belonging to the group at the time of projection of the contents data.

The group information may further include information relating to a projection plane onto which the images were projected.

The information processing apparatus may further include: a group information sharing unit that allows the group information to be shared among the information processing apparatuses belonging to the group; and a group information updating unit that updates the group information.

The information processing apparatus may further include a projection position control unit that controls the projection position of the image projected by the projection unit on the basis of the group information and the correction information.

When the positions of the images projected by the projection units of the information processing apparatuses belonging to the group are different from positions decided on the basis of the group information and the correction information, the projection position control unit may project guiding images such that the images can be projected into the positions.

The information processing apparatus may further include an image cutout unit that cuts out a portion of the image included in the contents data to be projected by the projection unit on the basis of the group information.

The information processing apparatus may further include an image correction unit that corrects the portion of the image included in the contents data to be projected by the projection unit on the basis of the group information.

The information processing apparatus may further include a group separation unit that separates from the group formed by the group formation unit after notifying the separation from the group to the other information processing apparatuses belonging to the group.

The contents data may include image data and metadata.

The metadata may include information relating to the contents of the image data, genre, recommended projection image size, type, and resolution.

The contents data may have a plurality of image data.

Further, one aspect of the present technology is an information processing method including: forming a group for projecting one contents data in cooperation with other information processing apparatuses including projection units to project images and imaging units to shoot a subject and obtain shot images; sharing correction information as information relating to correction made to the images projected by the projection units of the information processing apparatuses belonging to the formed group among the information processing apparatuses belonging to the formed group; and updating the correction information for the subject information processing apparatus on the basis of the shot image obtained by shooting the image projected by the projection unit as a subject and the shared correction information.

In one aspect of the present technology, a group for projecting one contents data in cooperation with other information processing apparatuses including projection units to project images and imaging units to shoot a subject and obtain shot images is formed, correction information as information relating to correction made to the images projected by the projection units of the information processing apparatuses belonging to the formed group formed is shared among the information processing apparatuses belonging to the formed group, and the correction information for the subject information processing apparatus is updated on the basis of the shot image obtained by shooting the image projected by the projection unit as a subject and the shared correction information.

Effects of the Invention

According to the present technology, it is possible to process information. In addition, according to the present technology, it is possible to allow a plurality of projection units to project images more easily in cooperation.

BRIEF DESCRIPTION OF DRAWINGS

FIG. 4 is a diagram illustrating an example of image correction.

FIG. 12 is a flowchart describing an example of processes for group formation.

FIG. 13 is a diagram describing an example of group information.

FIG. 16 is a diagram describing an example of correction information.

FIGS. 17A, 17B, 17C, 17D and 17E are a diagram describing an example of projection position control.

FIGS. 19A, 19B and 19C is a diagram describing an example of projection position control.

FIG. 20 is a flowchart describing an example of processes for image projection.

FIG. 22 is a diagram describing an example of metadata.

MODE FOR CARRYING OUT THE INVENTION

Figure 1:
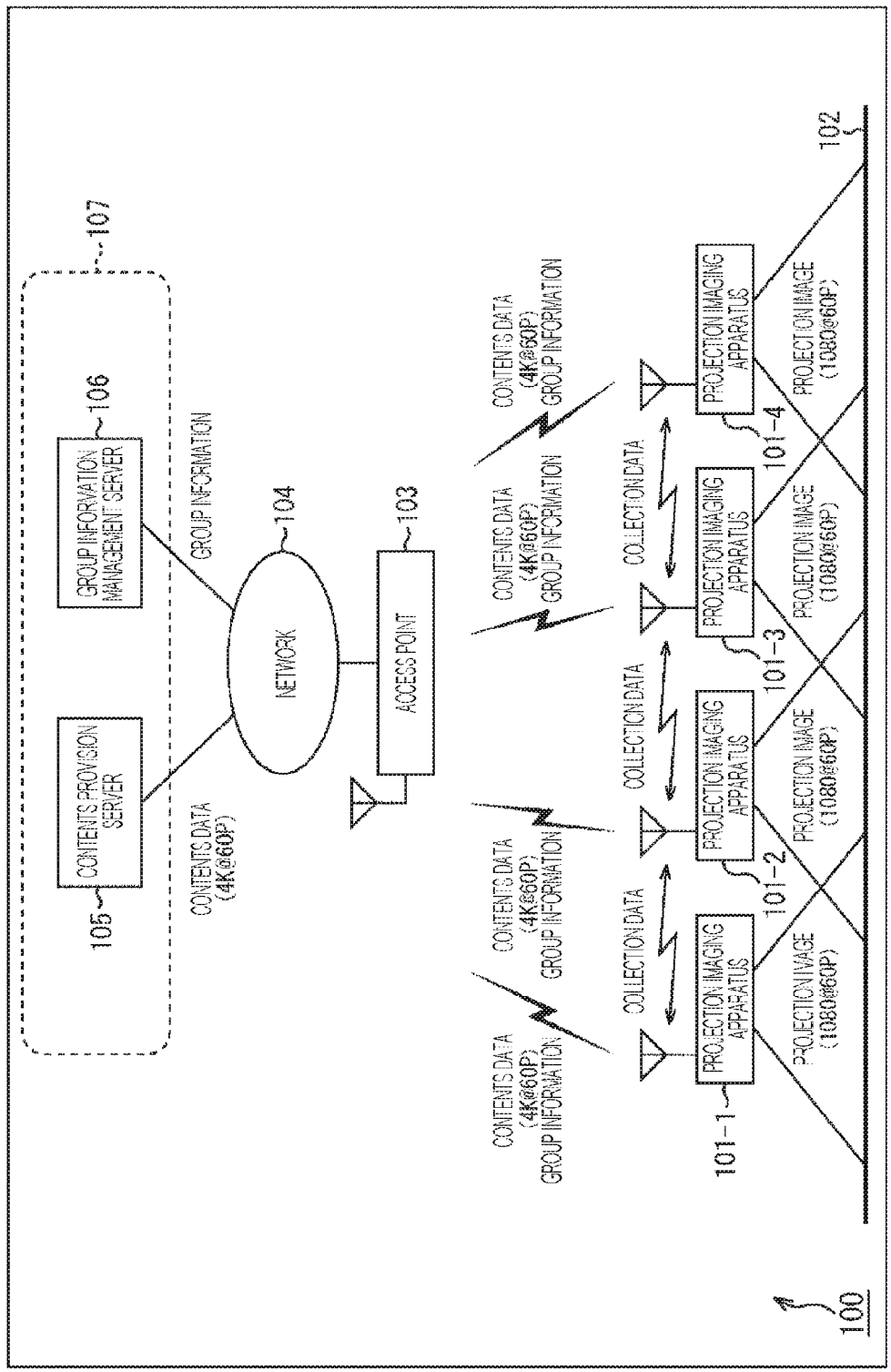
FIG. 1 is a diagram illustrating a main configuration example of a projection imaging system.

Modes for carrying out the present disclosure (hereinafter, called embodiments) will be explained below. The explanation will be given in the following order:

1. First Embodiment (projection imaging system)

1. First Embodiment

<Cooperation Among Projection Imaging Apparatuses>

Projection systems with a plurality of projectors are generally used to project images onto horizontally-long cylindrical projection planes at exhibition halls or perform projection mapping onto wall surfaces of buildings as a recent trend. In performing such projection, basically, a personal computer (PC) outputs data to a plurality of projectors via a graphics processing unit (GPU) board or the like and causes the plurality of projectors to project images by an application software or a device driver on the PC in most cases.

Therefore, various image corrections necessary for projection by the plurality of projectors are also made in the PC. For sensing the shape of a projection plane or the like, a correction image based on the correction data is generally created in the PC and output therefrom on the basis of imaging data in a specific pattern obtained by shooting with a camera connected via a universal serial bus (USB) to the PC.

That is, this system requires, besides the projectors, the PC for controlling, a camera for sensing, complicated programs for executing system operations, operators with technical knowledge, and others. It suits expensive and large-scaled systems but does not suit simple and less expensive systems that general users without expertise can enjoy casually. Therefore, it is not easy to allow the plurality of projectors to cooperate with one another in the system.

According to the present technology, a group for projecting one contents data in cooperation with other information processing apparatuses each including a projection unit that projects images and an imaging unit that shoots a subject and obtains a shot image is formed, correction information as information relating to correction made to the image projected by the projection unit of the information processing apparatuses belonging to the formed group is shared among the information processing apparatuses belonging to the group formed by a group formation unit, and the correction information for the subject information processing apparatus is updated on the basis of the shot image obtained by shooting the image projected by the projection unit as a subject and the shared correction information.

This makes it possible to allow the plurality of projection units to project images more easily in cooperation.

Incidentally, the correction information may include information relating to correction made to predetermined representative pixels in the image.

The information relating to the correction made to the representative pixels may include coordinates before and after the correction of the representative pixel, the gain and shift values of respective color components of the representative pixels, and a coefficient of color conversion matrix of the representative pixels.

In addition, a wireless communication unit performing wireless communications may be further included. Moreover, the group formation unit may form the group including other information processing apparatuses with which wireless communications were performed by the wireless communication unit and the subject information processing apparatus.

In addition, the group formation unit may form the group including other information processing apparatuses connected to the subject information processing apparatus via predetermined communication cables and the subject information processing apparatus.

Further, the group formation unit may generate group information as information relating to the formed group.

Further, the group information may include identification information for identifying the group and the correction information for the information processing apparatuses constituting the group corresponding to the group information.

In addition, the group information may further include information relating to the kinds of contents data that were projected by the group in the past.

Further, the group information may further include the layout of the images projected by the projection units of the information processing apparatuses belonging to the group at the time of projection of the contents data.

Moreover, the group information may further include information relating to a projection plane onto which the images were projected.

In addition, a group information sharing unit that allows the group information to be shared among the information processing apparatuses belonging to the group and a group information updating unit that updates the group information may be further included.

In addition, a projection position control unit that controls the projection position of the image projected by the projection unit on the basis of the group information and the correction information may be further included.

When the positions of the images to be projected by the projection units of the information processing apparatuses belonging to the group are different from positions decided on the basis of the group information and the correction information, the projection position control unit may further project guiding images such that the images can be projected into the positions.

An image cutout unit that cuts out a portion of the image included in the contents data to be projected by the projection unit on the basis of the group information may be further included.

An image correction unit that corrects the portion of the image included in the contents data to be projected by the projection unit on the basis of the group information may be further included.

A group separation unit that separates from the group formed by the group formation unit after notifying the separation from the group to the other information processing apparatuses belonging to the group may be further included.

In addition, the contents data may include image data and metadata.

Further, the metadata may include information relating to the contents of the image data, genre, recommended projection image size, type, and resolution.

Further, the contents data may have a plurality of image data.

<Projection Imaging System>

FIG. 1 illustrates a main configuration example of a projection imaging system to which a control apparatus is applied as an embodiment of the information processing apparatus to which the present technology is applied. A projection imaging system 100 illustrated in FIG. 1 is a system that projects images. For example, the projection imaging system 100 can allow a plurality of projection imaging apparatuses to project contents of moving images, still images, and others in cooperation as described above. As illustrated in FIG. 1, the projection imaging system 100 has projection imaging apparatuses 101-1 to 101-4.

The projection imaging apparatuses 101-1 to 101-4 are apparatuses that project images onto a screen 102 and shoot images projected on the screen 102. The projection imaging apparatuses 101-1 to 101-4 have similar configurations and have similar functions. In the following description, the projection imaging apparatuses 101-1 to 101-4 will be called projection imaging apparatuses 101 when there is no need to discriminate among them.

The projection imaging apparatuses 101 are in the state of being communicable with one another by wireless communication such as a wireless local area network (LAN) via an access point 103, for example. In addition, the projection imaging apparatuses 101 are connected to a network 104 via the access point 103 and can communicate with other apparatuses connected to the network 104.

The access point 103 is a device relaying communications, and can communicate wirelessly with the projection imaging apparatuses 101 and is connected to the network 104. The access point 103 can relay the communications among the projection imaging apparatuses 101. The access point 103 can also relay the communications between the projection imaging apparatuses 101 and the network 104 (other communication apparatuses connected to the network 104).

The network 104 is a communication network as a communication medium. The network 104 may be any communication network, and may be a wired communication network, a wireless communication network, or both. For example, the network 104 may be a wired LAN, a wireless LAN, a public telephone network, a wide area communication network for wireless mobile objects such as a 3G line or a 4G line, the Internet, or a combination of these. In addition, the network 104 may be a single communication network or a plurality of communication networks. Further, the network 104 may be partly or entirely composed of a communication cable under predetermined standards such as a universal serial bus (USB) cable or a high-definition multimedia interface (HDMI) cable, for example.

For example, a contents provision server 105, a group information management server 106, and the like are connected to the network 104.

The contents provision server 105 is a server that provides the projection imaging apparatuses 101 with contents data including the images to be projected by the projection imaging apparatuses 101. The contents provision server 105 manages the contents data to be provided and provides the contents data in response to a request from the client side such as the projection imaging apparatuses 101, for example. Means for providing the contents data can be arbitrarily set but the contents data is to be provided via the network 104 and the access point 103, for example. In addition, the method for providing the contents data can be arbitrarily set and may be streaming delivery or downloading. Further, the providing service may be fee-charging service or free service.

Furthermore, the details of the contents data will be provided later. For example, the contents data include one or more image data, audio data, metadata including control information, and the like. These data may be archived and further compressed, and may be independent of one another.

The group information management server 106 manages group information as information relating to the group formed by the plurality of projection imaging apparatuses 101. The group information management server 106 stores and manages the group information provided by the projection imaging apparatuses 101 as clients, that is, information on the groups formed in the past (a history of group information). In response to a request from the client, for example, the group information management server 106 provides the requested group information out of the managed group information to the client as a requester. That is, the projection imaging apparatuses 101 can easily reproduce a group similar to the group formed in the past by making group settings on the basis of the group information. In addition, the projection imaging apparatuses 101 can form a new group more easily by modifying the group information.

Although the means for providing the group information can be arbitrarily set, the group information is provided via the network 104 and the access point 103, for example. This service may be a fee-charging service or a free service.

The contents provision server 105 and the group information management server 106 can be arbitrarily configured. For example, the contents provision server 105 and the group information management server 106 may be implemented by one server 107, or the contents provision server 105 or the group information management server 106 or both may be implemented by a plurality of servers. For example, these servers may be provided as a cloud service.

The contents providing service and the group information management service have been explained so far. As a matter of course, any service other than these may be provided to the projection imaging apparatuses 101.

The screen 102 is an example of a plane onto which the projection imaging apparatuses 101 project images (projection plane). The screen 102 may be a flat plane or a curved plane. For example, the surface of the screen 102 may have asperities. In addition, the color of the screen 102 can be arbitrarily set. Incidentally, instead of the screen 102, a predetermined three-dimensional structure (for example, a building, a wall, a floor, furniture, a small object, a living object, or the like) may be used as a projection plane.

Incidentally, the source of provision of images to be projected by the projection imaging apparatuses 101 can be arbitrarily set. For example, the images may be stored in advance in the projection imaging apparatuses 101 or may be provided to the projection imaging apparatuses 101 by the use of a recording medium or the like. In such cases, the contents provision server 105 and the group information management server 106 are unnecessary. Also in such cases, the network 104 is also unnecessary. In addition, the projection imaging apparatuses 101 may communicate with one another without the access point 103. Further, the communication method can be arbitrarily set, and may be wireless communication or wired communication. In that case, the access point 103 is also unnecessary.

<Cooperative Projection>

For example, the contents provision server 105 provides contents data including a progressive scanned image (4K@60P) at a resolution 4K (for example, 4096×2160) and a frame rate of 60 fps to the individual projection imaging apparatuses 101. Upon receipt of the contents data, each of the projection imaging apparatuses 101 cuts a partial image (for example, a progressive scanned image (1080@60P) at a resolution of full HD and a frame rate of 60 fps) assigned thereto from the image (4K@60P) and projects the cut image onto the screen 102.

Figure 2:
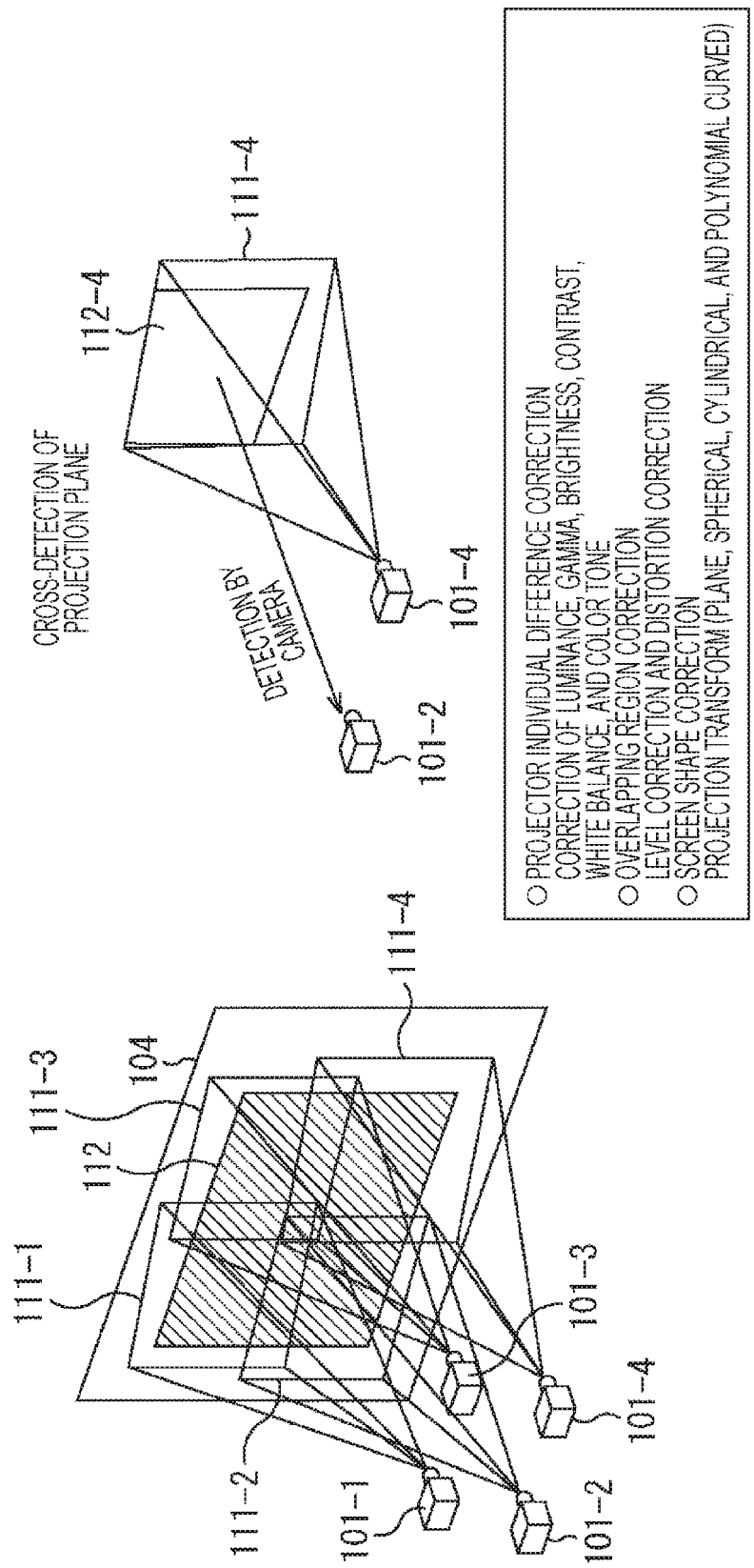
FIG. 2A and FIG. 2B are a block diagram of an example of projection in cooperation.

For example, the projection imaging apparatuses 101 project images in such a layout as illustrated in FIG. 2A. In the example illustrated in FIG. 2A, the projection imaging apparatuses 101 project two vertically arranged images and two horizontally arranged images (2×2) onto the screen 102. More specifically, the projection imaging apparatus 101-1 projects a projection image 111-1 onto the upper left of the screen 102, the projection imaging apparatus 101-2 projects a projection image 111-2 onto the lower left of the screen 102, the projection imaging apparatus 101-3 projects a projection image 111-3 onto the upper right of the screen 102, and the projection imaging apparatus 101-4 projects a projection image 111-4 onto the lower right of the screen 102. In the following description, the projection images 111-1 to 111-4 will be called projection images 111 when there is no need to discriminate among them.

As illustrated in FIG. 2A, the projection images 111-1 to 111-4 partially overlap one another to form one region. The individual projection images 111 include the partial images (1080@60P) described above. In the projection state as illustrated in FIG. 2A, a projection image 112 of the image (4K@60P) is formed on the screen 102. More specifically, the projection image 111-1 includes the upper left partial image of the image (4K@60P), the projection image 111-2 includes the lower left partial image of the image (4K@60P), the projection image 111-3 includes the upper right partial image of the image (4K@60P), and the projection image 111-4 includes the lower right partial image of the image (4K@60P). As described above, the projection images 111 overlap partially one another, and therefore the partial images included in the projection images 111 may be images higher in resolution (that is, wider) than the full-HD image.

By causing the projection imaging apparatuses 101-1 to 101-4 to cooperate with one another as described above, the projection imaging system 100 can project the image (4K@60P) at a resolution of 4K without lowering the resolution (without decreasing image quality).

Incidentally, to implement the projection image 112, the projection images 111 need to be subjected to positioning, geometric correction, and the like. The projection imaging apparatuses 101 include the imaging function and can use the imaging function to sense the projection images projected by itself and the other apparatuses as illustrated in FIG. 2B. The projection imaging apparatuses 101 make various corrections on the basis of the sensor data, whereby the partial images can be combined in a more natural manner on the screen 102 to form the one projection image 112.

The contents of the image corrections include projector individual variability correction, overlap correction, screen shape correction, and others as illustrated in FIG. 2B. The projector individual variability correction is correction for luminance, gamma, brightness, contrast, white balance, color tone, and the like, for example. The overlap correction is correction made to an overlap region in which the projection images 111 overlap one another. For example, the overlap correction may include level correction, distortion correction, and the like. The screen shape correction is correction for the shape and posture of the screen 102. For example, the screen shape correction may include projection transform (flat plane, sphere, cylinder (circular column shape), and polynomial curve). As a matter of course, any correction other than these may be made.

Figure 3:
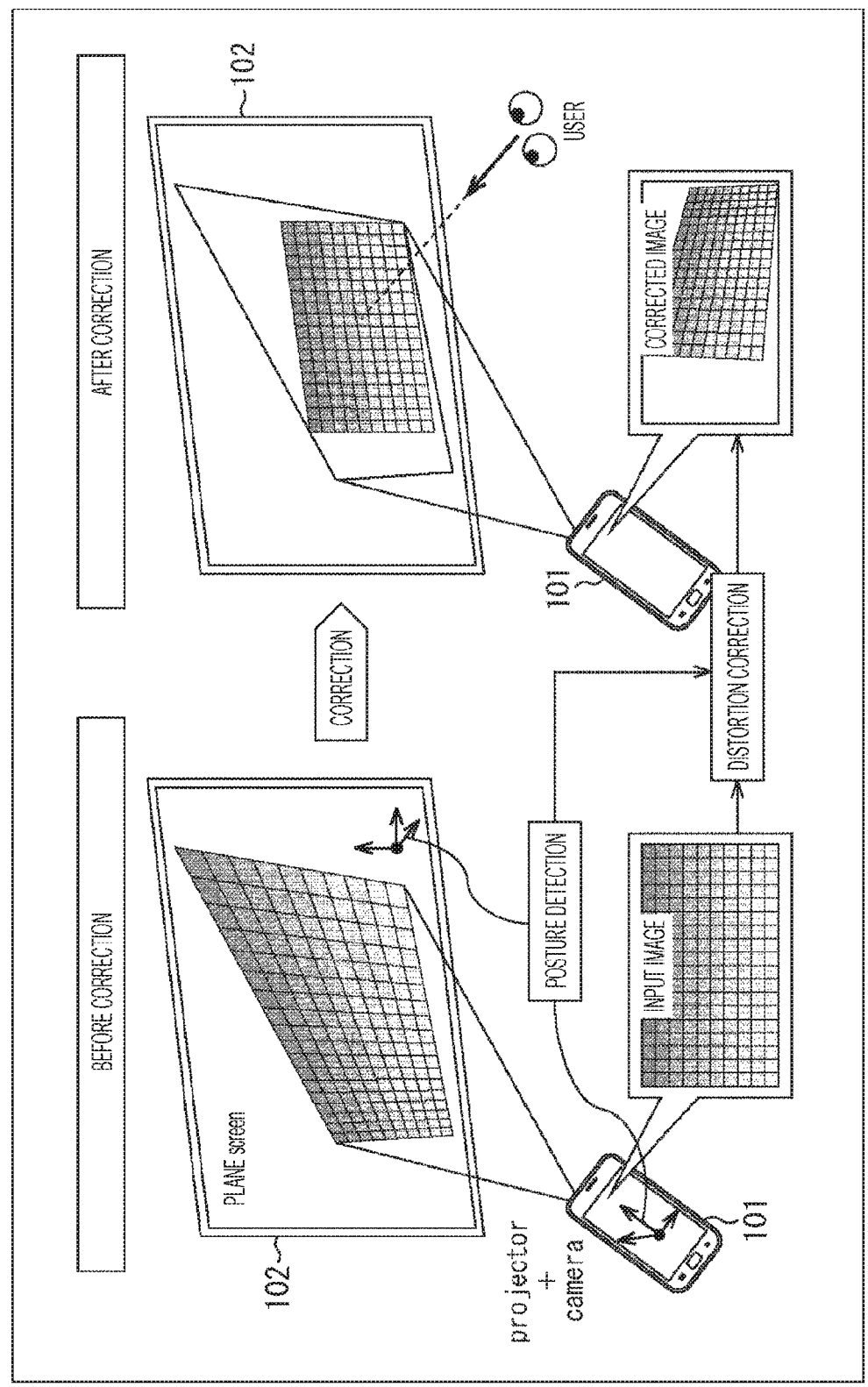
FIG. 3 is a diagram illustrating an example of image correction.

For example, as illustrated in FIG. 3, when the screen 102 is oriented obliquely with respect to the projection imaging apparatus 101, the projection image becomes distorted without correction. However, the distortion can be reduced by projection transform and the like. In addition, when a plurality of images is to be projected onto a curved plane as in the example of FIG. 4, for example, those images can be projected as one image by projection transform and the like.

<Example of Using the Projection Imaging System>

Figure 5B:
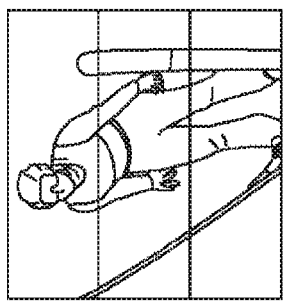
FIGS. 5A, 5B, 5C and 5D are diagram describing a usage example.
Figure 5D:
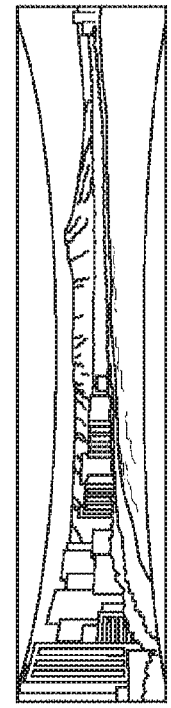
Figure 5A:
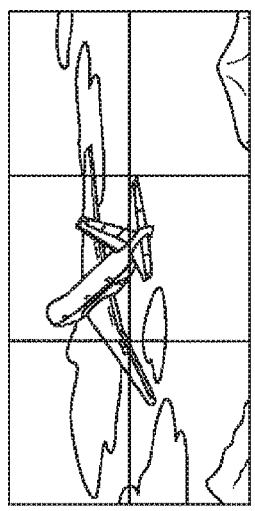

Using the projection imaging system 100 enables various projection modes. For example, by aligning a plurality of projection images as illustrated in FIG. 5A, the resolution of the entire projection image can be increased. In addition, as in the example of FIG. 5B, the aspect ratio of the projection image (entire image) can be freely set independently of the specifications of the projection imaging apparatuses 101 depending on the alignment of the projection images (partial images) projected by the projection imaging apparatuses 101.

Figure 5C:
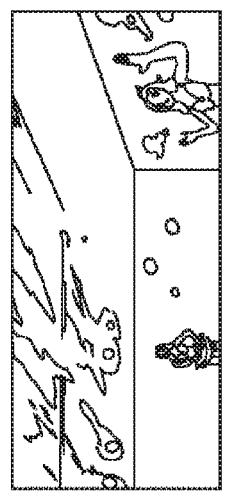

In addition, as in the example of FIG. 5C, images can be projected without distortion onto a plurality of walls and ceilings (that is, screens oriented in a plurality of directions (in other words, a three-dimensional structure)). Further, in the example of FIG. 5D, images can be projected without distortion onto a wide and curved screen surrounding viewers.

With improvement in the degree of freedom for the projection plane, the projection image increases in expressiveness to enhance realistic feeling and visibility, for example, thereby improving entertainment value and artistic quality.

<Outer Appearance of the Projection Imaging Apparatus>

Figure 6:
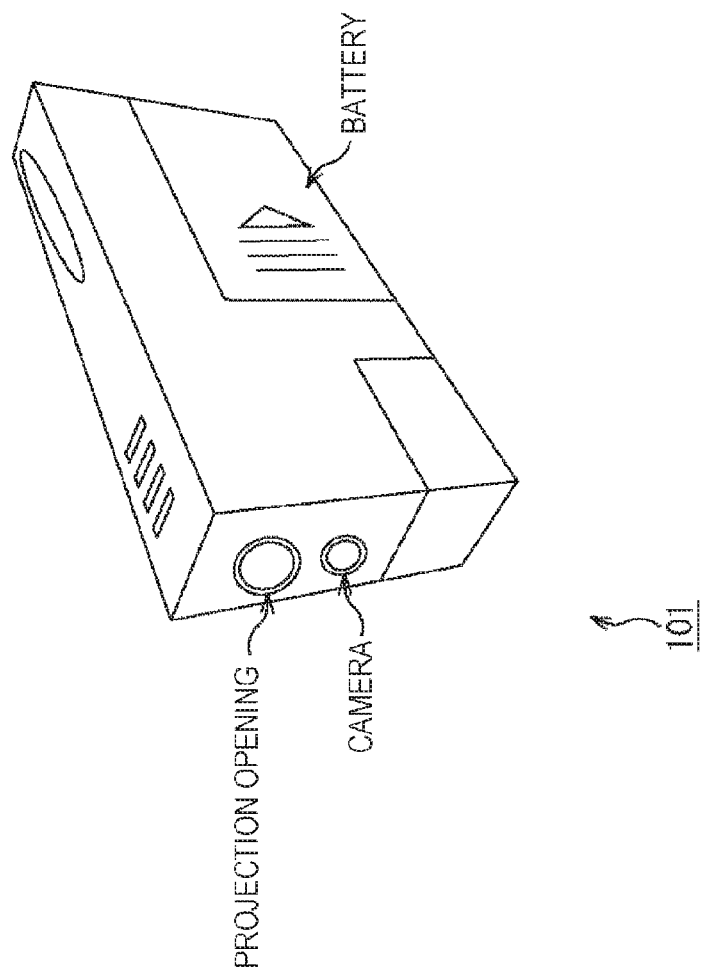
FIG. 6 is a diagram illustrating an example of an outer appearance of the projection imaging apparatus.

Next, the projection imaging apparatus 101 will be explained. FIG. 6 illustrates an example of outer appearance of the projection imaging apparatus 101. The projection imaging apparatus 101 has the projection function and the imaging function as described above. The casing of the projection imaging apparatus 101 is provided with optical devices such as a projection opening (lens mechanism) for projecting images and a camera for imaging a subject (lens mechanism). In addition, the projection imaging apparatus 101 may be an apparatus of any size and may be a portable (small-sized) apparatus, for example. In that case, as illustrated in FIG. 6, the casing of the projection imaging apparatus 101 may be provided with a battery. By providing the battery, the projection imaging apparatus 101 can be driven without an external power source, thereby improving the degree of freedom for the placement position. That is, the plurality of projection imaging apparatuses 101 can project images more easily in cooperation.

<Projection Imaging Apparatus>

Figure 7:
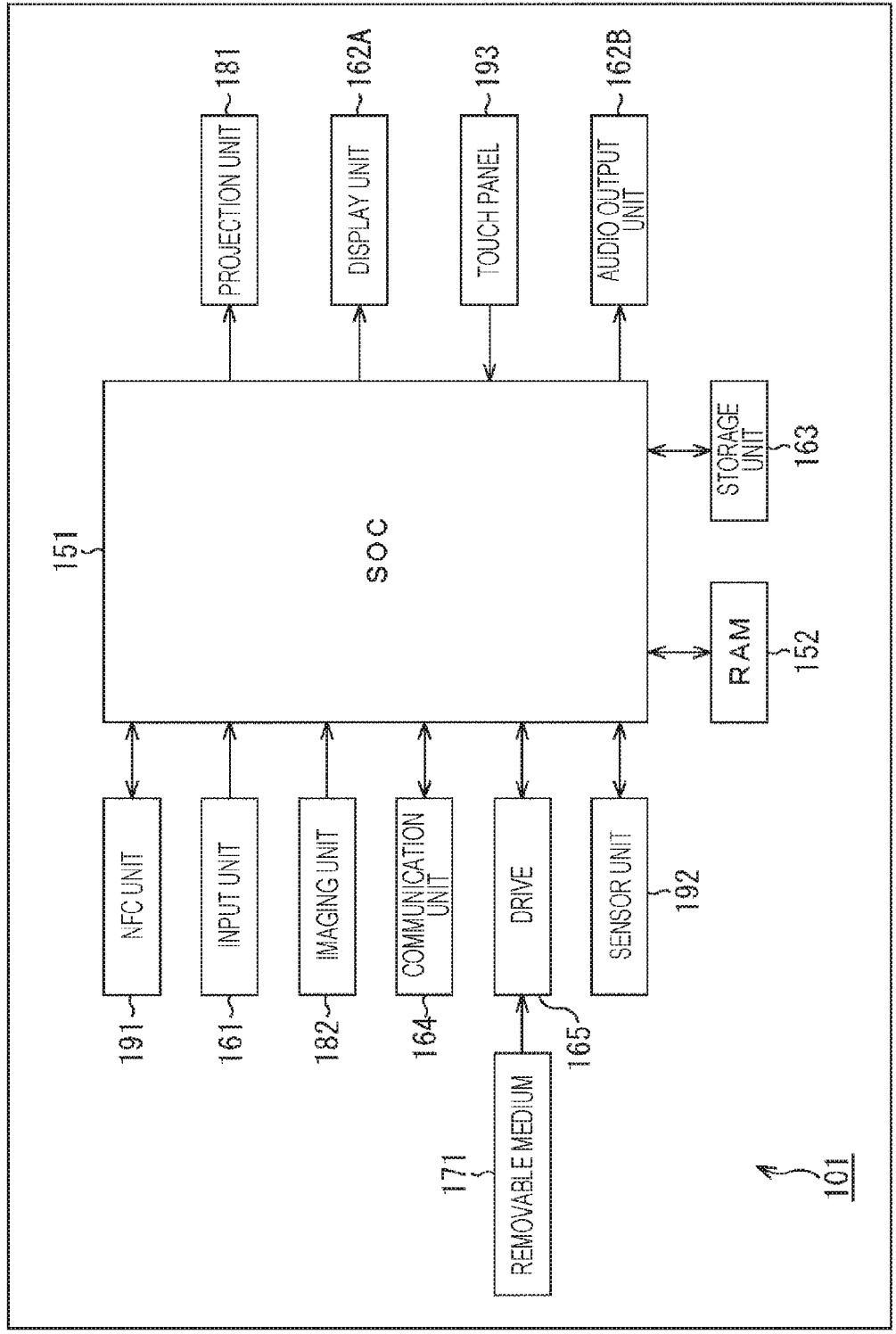
FIG. 7 is a block diagram illustrating a main configuration example of the projection imaging apparatus.

FIG. 7 is a block diagram illustrating a main configuration example of the projection imaging apparatus 101.

As illustrated in FIG. 7, the projection imaging apparatus 101 has a system-on-a-chip (SOC) 151, a random access memory (RAM) 152, an input unit 161, a display unit 162A, an audio output unit 162B, a storage unit 163, a communication unit 164, a drive 165, a projection unit 181, an imaging unit 182, a near field communication (NFC) unit 191, a sensor unit 192, and a touch panel 193.

The SOC 151 is a chip with various functions implemented by the projection imaging apparatus 101. The SOC 151 loads programs and data into the RAM 152 and executes the same.

The input unit 161 is composed of external input terminals such as an HDMI terminal and input devices such as operation buttons and a microphone, for example. The display unit 162A has a display device displaying images and messages, for example. The audio output unit 162B is composed of a speaker and the like, for example.

The storage unit 163 is composed of a hard disc, a RAM disc, a non-volatile memory, and the like, for example. The communication unit 164 is composed of a network interface, for example. The drive 165 drives a removable medium 171 such as a magnetic disc, an optical disc, a magneto-optical disc, or a semiconductor memory to read information from the removable medium 171 and write information into the removable medium 171, for example.

The projection unit 181 performs processes relating to image projection. For example, the projection unit 181 projects an image supplied by the SOC 151 onto the outside of the projection imaging apparatus 101 (for example, the screen 102 or the like). That is, the projection unit 181 implements the projection function. The projection unit 181 uses laser light as a light source to perform scanning with the laser light using an MEMS mirror to project the image. As a matter of course, the light source of the projection unit 181 can be arbitrarily set, and is not limited to the laser light but may be a light emitting diode (LED), a xenon lamp, or the like. The details of the projection unit 181 will be provided later.

The imaging unit 182 shoots a subject outside the apparatus, generates a shot image of the subject, and supplies the shot image to the SOC 151. That is, the imaging unit 182 implements the imaging function. For example, the imaging unit 182 shoots a projection image projected by the projection unit 181 onto the screen 102.

The NFC unit 191 performs proximity wireless communications with another communication device in proximity. For example, the NFC unit 191 transmits and receives information relating to communication settings necessary for establishing communications by the communication unit 164 through the near field wireless communications.

The sensor unit 192 has arbitrary sensors such as an acceleration sensor, an optical sensor, and a temperature sensor, and supplies the SOC 151 with information relating to environments outside the projection imaging apparatus 101 obtained by sensing (sensor data).

The touch panel 193 is superimposed on the screen image display surface of the display unit 162A, for example. The touch panel 193 accepts information indicated by an operation performed on the basis of a GUI displayed on the display unit 162A (that is, user input), and supplies the accepted user input to the SOC 151.

The SOC 151 loads programs stored in the storage unit 163 into the RAM 152 and executes the same to perform various processes, for example. The RAM 152 also stores as appropriate data necessary for the SOC 151 to execute the various processes.

The programs executed by the SOC 151 can be recorded in the removable medium 171 as a package medium or the like, for example, and provided to the projection imaging apparatus 101. In that case, the programs can be installed into the storage unit 163 via the SOC 151 by attaching the removable medium 171 to the drive 165.

In addition, the programs can also be provided to the projection imaging apparatus 101 via a wired or wireless transfer medium such as a LAN, the Internet, or digital satellite broadcasting. In that case, the programs can be received by the communication unit 164 via the wired or wireless transfer medium and installed in the storage unit 163.

Besides, the programs can also be installed in advance in the ROM in the SOC 151 or the storage unit 163.

<Projection Unit>

Figure 8:
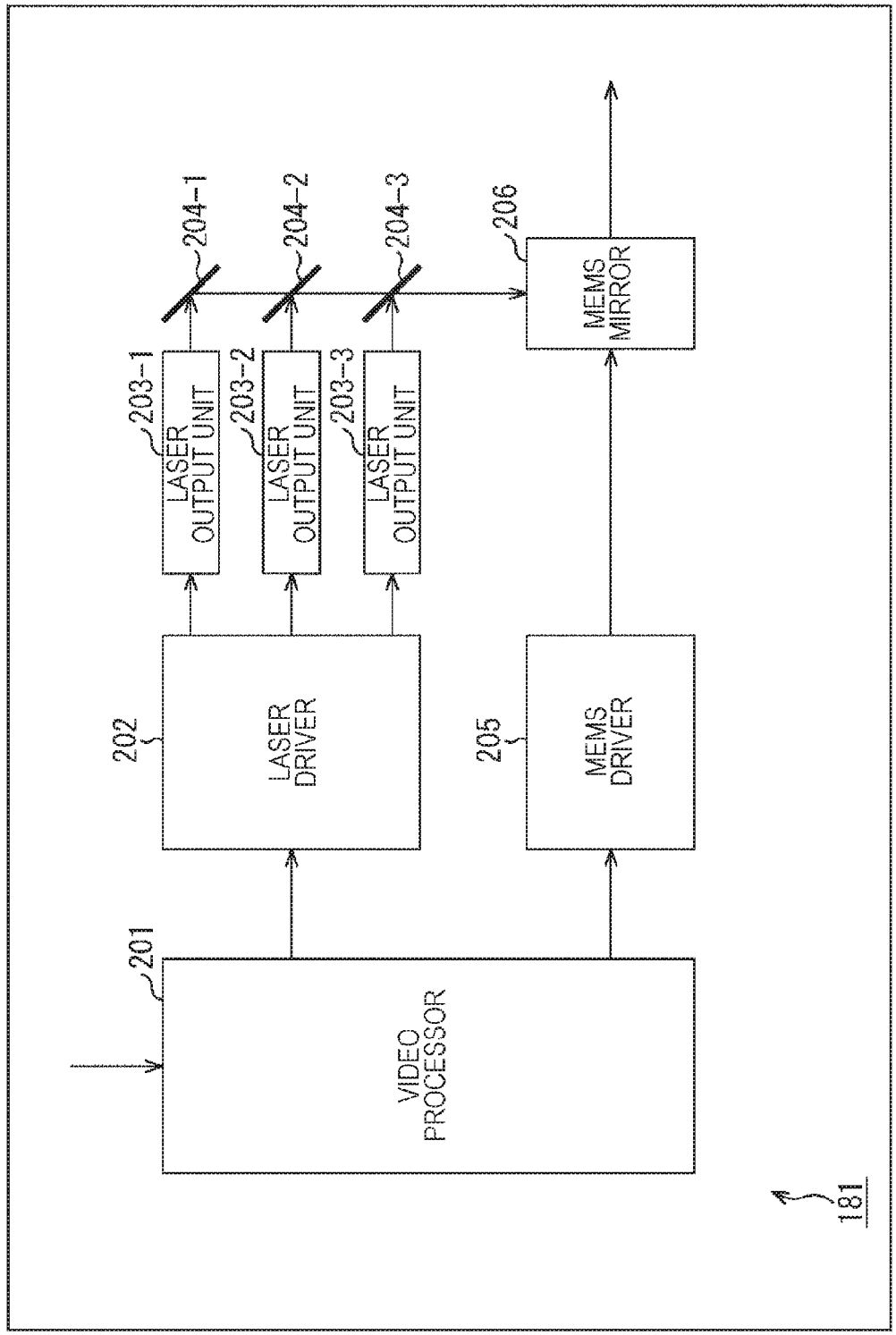
FIG. 8 is a block diagram illustrating a main configuration example of a projection unit.

FIG. 8 is a block diagram illustrating a main configuration example of the projection unit 181. As illustrated in FIG. 8, the projection unit 181 has a video processor 201, a laser driver 202, a laser output unit 203-1, a laser output unit 203-2, a laser output unit 203-3, a mirror 204-1, a mirror 204-2, a mirror 204-3, a micro electro mechanical systems (MEMS) driver 205, and a MEMS mirror 206.

The video processor 201 holds the images supplied by the SOC 151 and performs necessary image processing on the images. The video processor 201 supplies the image to be projected to the laser driver 202 and the MEMS driver 205.

The laser driver 202 controls the laser output units 203-1 to 203-3 to project the image supplied by the video processor 201. The laser output units 203-1 to 203-3 output laser light of different colors (wavelength regions) of red, blue, green, and the like, for example. That is, the laser driver 202 controls laser output of respective colors to project the image supplied by the video processor 201. Incidentally, in the following description, the laser output units 203-1 to 203-3 will be called laser output units 203 when there is no need to discriminate among them.

The mirror 204-1 reflects the laser light output from the laser output unit 203-1 and guides the same to the MEMS mirror 206. The mirror 204-2 reflects the laser light output from the laser output unit 203-2 and guides the same to the MEMS mirror 206. The mirror 204-3 reflects the laser light output from the laser output unit 203-3 and guides the same to the MEMS mirror 206. Incidentally, in the following description, the mirrors 204-1 to 204-3 will be called mirrors 204 when there is no need to discriminate among them.

Figure 9:
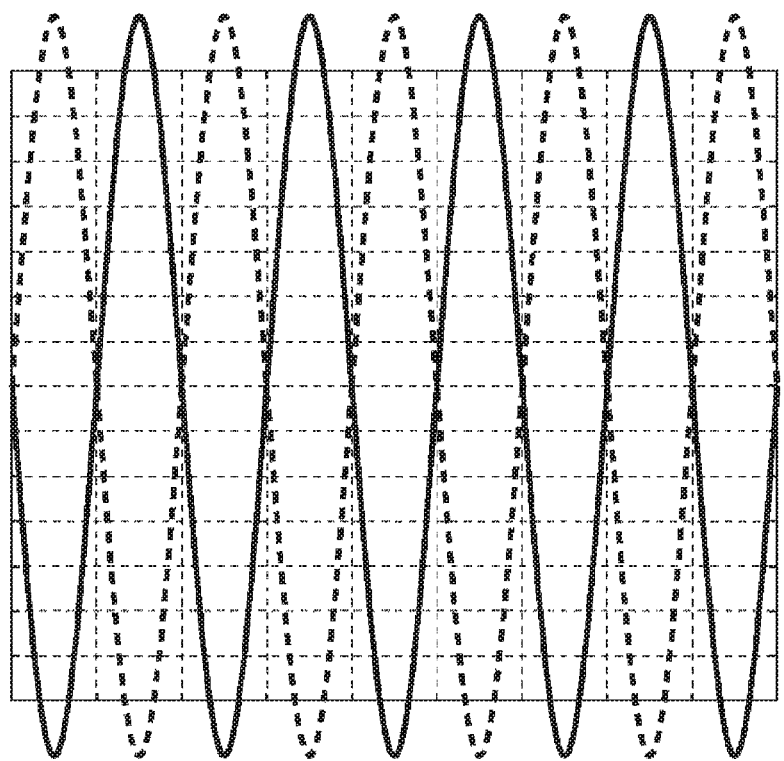
FIG. 9 is a diagram illustrating an example of scanning with laser light.

The MEMS driver 205 controls driving of the MEMS mirror 206 to project the image supplied by the video processor 201. The MEMS mirror 206 drives the mirror attached to the MEMS in accordance with the control of the MEMS driver 205 to perform scanning with the laser light of respective colors as in the example of FIG. 9, for instance. The laser light is output from the projection opening to the outside of the apparatus and then applied to the screen 102, for example. Accordingly, the image supplied from the video processor 201 is projected onto the screen 102.

Incidentally, in the example of FIG. 8, three laser output units 203 are provided to output laser light of three colors. However, the number of laser lights (or the number of colors) can be arbitrarily set. For example, the number of the laser output units 203 may be four or more or two or less, for example. That is, the number of beams of laser light output from the projection imaging apparatus 101 (the projection unit 181) may be two or less or four or more. In addition, the number of colors of laser light output from the projection imaging apparatus 101 (the projection unit 181) can be also arbitrarily set and may be two or less or four or more. Further, the configuration of the mirrors 204 and the MEMS mirror 206 can be arbitrarily set and is not limited to the example of FIG. 8. As a matter of course, the scanning pattern with the laser light can be arbitrarily set.

<Functional Blocks>

Figure 10:
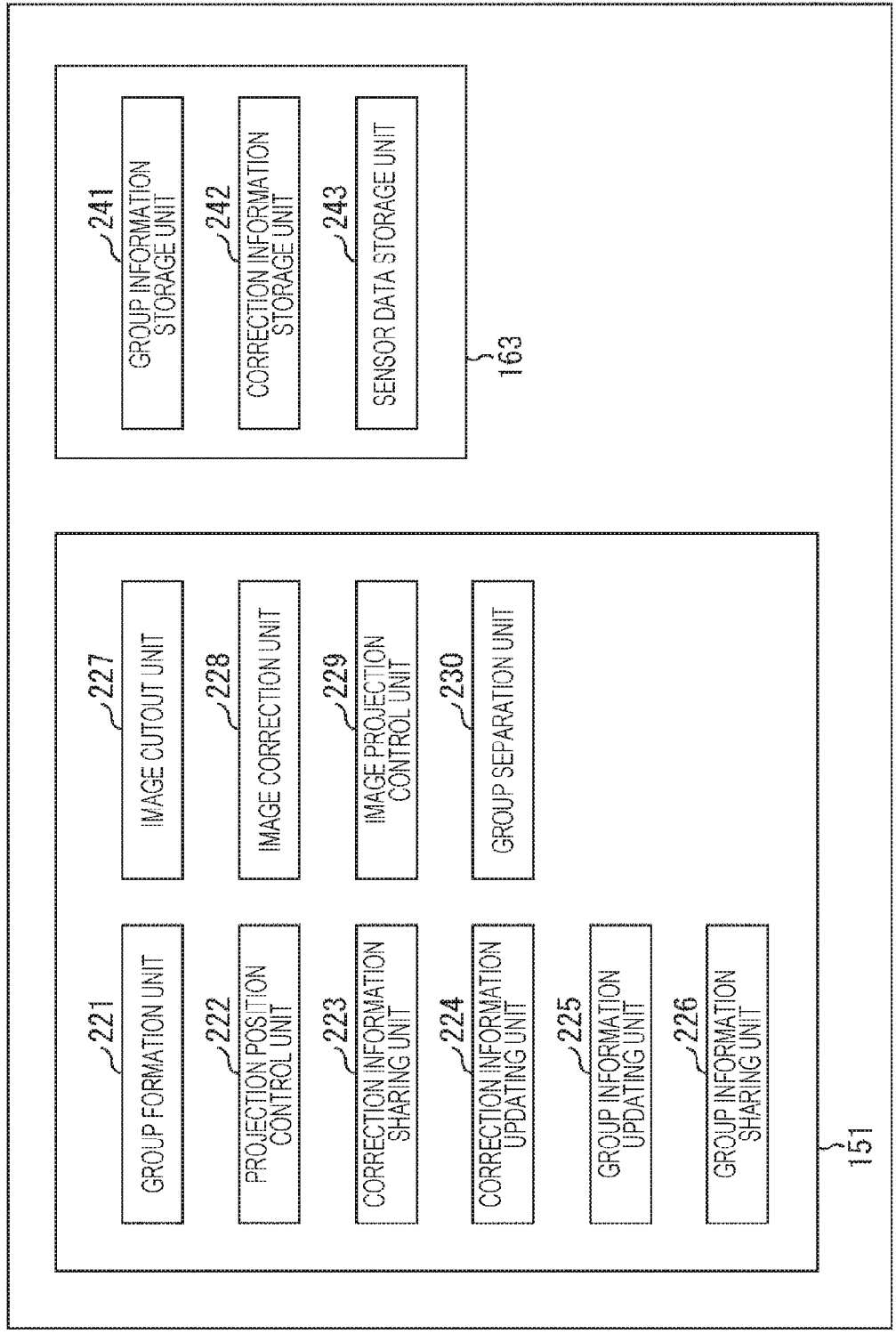
FIG. 10 is a functional block diagram illustrating an example of functions implemented by an SOC.

The SOC 151 of the projection imaging apparatus 101 executes the programs to implement various functions. FIG. 10 is a functional block diagram illustrating an example of functions implemented by the SOC 151.

As illustrated in FIG. 10, the SOC 151 implements functional blocks such as a group formation unit 221, a projection position control unit 222, a correction information sharing unit 223, a correction information updating unit 224, a group information updating unit 225, a group information sharing unit 226, an image cutout unit 227, an image correction unit 228, an image projection control unit 229, a group separation unit 230, and the like.

The group formation unit 221 performs a process for grouping the projection imaging apparatuses 101. The projection position control unit 222 performs a process for controlling the projection position of the projection image. The correction information sharing unit 223 performs a process for sharing correction information. The correction information updating unit 224 performs a process for updating the correction information. The group information updating unit 225 performs a process for updating group information. The group information sharing unit 226 performs a process for sharing the group information. The image cutout unit 227 performs a process for cutting out the images to be projected. The image correction unit 228 performs a process for correcting the image to be projected. The image projection control unit 229 performs a process for controlling the projection of the image. The group separation unit 230 performs a process for separating from the group.

In addition, these functional blocks perform the processes to form storage regions in the storage unit 163 such as a group information storage unit 241, a correction information storage unit 242, and a sensor data storage unit 243, for example. The group information storage unit 241 is a storage region for storing the group information. The correction information storage unit 242 is a storage region for storing the correction information. The sensor data storage unit 243 is a storage region for storing the sensor data.

<Contents Provision Server>

Figure 11:
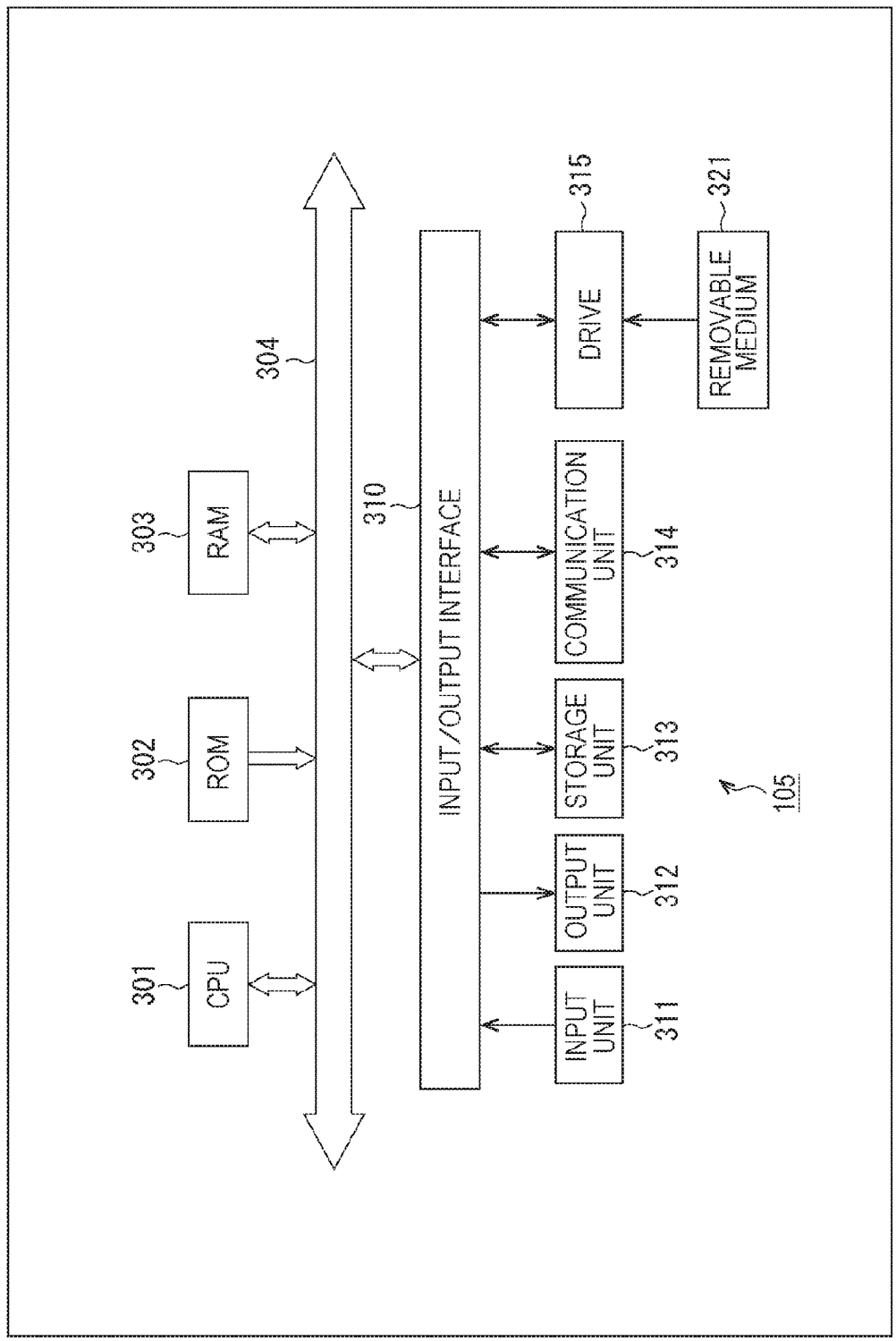
FIG. 11 is a block diagram illustrating a main configuration example of a contents provision server.

Next, a configuration of the server will be explained. FIG. 11 is a block diagram illustrating a main configuration example of the contents provision server 105.

As illustrated in FIG. 11, in the contents provision server 105, a central processing unit (CPU) 301, a read only memory (ROM) 302, and a random access memory (RAM) 303 are connected together via a bus 304.

An input/output interface 310 is also connected to the bus 304. An input unit 311, an output unit 312, a storage unit 313, a communication unit 314, and a drive 315 are connected to the input/output interface 310.

The input unit 311 is composed of an input device that accepts external information such as user input. For example, the input unit 311 includes operation buttons, a touch panel, a camera, a microphone, input terminals, and others. In addition, the input unit 311 may include various sensors such as an acceleration sensor, an optical sensor, and a temperature sensor.

The output unit 312 is composed of an output device that outputs information such as images and audio. For example, the output unit 312 includes a display, a speaker, output terminals, and others.

The storage unit 313 is composed of a hard disc, a RAM disc, a non-volatile memory, and the like, for example. The communication unit 314 is composed of a network interface, for example. The communication unit 314 is connected to the network 104 to communicate with another apparatus (for example, the projection imaging apparatus 101) connected via the network 104, for example. The drive 315 drives a removable medium 321 such as a magnetic disc, an optical disc, a magneto-optical disc, or a semiconductor memory, for example.

The CPU 301 loads programs stored in the storage unit 313 into the RAM 303 via the input/output interface 310 and the bus 304 and executes the same to perform various processes, for example. The RAM 303 also stores as appropriate data necessary for the CPU 301 to execute the various processes.

The programs executed by the CPU 301 can be recorded in the removable medium 321 as a package medium or the like, for example, and provided to the contents provision server 105. In that case, the programs can be installed into the storage unit 313 via the input/output interface 310 by attaching the removable medium 321 to the drive 315.

In addition, the programs can also be provided to the contents provision server 105 via a wired or wireless transfer medium such as a LAN, the Internet, or digital satellite broadcasting. In that case, the programs can be received by the communication unit 314 via the wired or wireless transfer medium and installed in the storage unit 313.

Besides, the programs can also be installed in advance in the ROM 302 or the storage unit 313.

Incidentally, the group information management server 106 is configured in a manner similar to the contents provision server 105. That is, the description in FIG. 11 is also applicable to the group information management server 106. In addition, in the case of providing the server 107, the server 107 is also configured in a manner similar to the contents provision server 105. That is, the description in FIG. 11 is also applicable to the server 107.

<Flows of Processes for Group Formation>

Next, flows of various processes executed by the apparatuses in the thus configured projection imaging system 100 will be explained.

First, an example of flows of processes for group formation will be explained with reference to FIG. 12. FIG. 12 illustrates an example of flows of processes by which the projection imaging apparatuses 101-2 to 101-4 form a group and the projection imaging apparatus 101-1 joins the group.

The method for forming a group (joining an existing group) can be arbitrarily set. For example, causing the projection imaging apparatuses 101 to perform proximity wireless communications may serve as a trigger for group formation. That case will be explained below. Specifically, the projection imaging apparatus 101-1 is an apparatus newly joining the group, the projection imaging apparatus 101-2 is an apparatus that accepts the joining of the projection imaging apparatus 101-1 (performs proximity wireless communications with the projection imaging apparatus 101-1), and the projection imaging apparatuses 101-3 and 101-4 are apparatuses that have joined the group before. The process performed by the projection imaging apparatus 101-4 is similar to that of the projection imaging apparatus 101-3 and descriptions thereof are omitted.

When the projection imaging apparatus 101-1 is brought into proximity to (contact with) the projection imaging apparatus 101-2, the group formation units 221 of the projection imaging apparatuses 101-1 and 101-2 use the NFC units 191 to start proximity wireless communications and exchange information necessary for establishment of communications with the use of the communication units 164 (steps S101 and S111).

The group formation units 221 of the projection imaging apparatuses 101-1 and 101-2 use the exchanged communication information to establish wireless communications with the use of the communication units 164. Further, the group formation unit 221 of the projection imaging apparatus 101-1 also establishes communications with the projection imaging apparatuses 101-3 and 101-4 in similar manners.

Upon the establishment of the wireless communications, the group formation unit 221 of the projection imaging apparatus 101-1 provides information relating to the subject apparatus to the other projection imaging apparatuses 101 by the wireless communications with the use of the communication units 164 to make a request for joining the group, for example.

The group formation units 221 of the projection imaging apparatuses 101-2 to 101-4 use the information from the projection imaging apparatus 101-1 to update the existing group information, and share the updated group information among the projection imaging apparatuses 101-1 to 101-4 by wireless communications with the use of the communication units 164, for example (steps S102, S112, and S121). When no group is formed, there exists no group information. Accordingly, the projection imaging apparatuses 101 generate newly group information and share the same.

In addition, the CPU 301 of the group information management server 106 provides past group information (historical group information) on the groups formed by the projection imaging apparatuses 101-1 to 101-4 requested by the projection imaging apparatuses 101 or the like via the communication unit 314 to the projection imaging apparatuses 101-1 to 101-4 (step S131). The projection imaging apparatuses 101 receive the historical group information by wireless communications via the communication units 164, for example (steps S103, S113, and S122), and use the received information when it is usable, and discard the received information when it is not usable.

FIG. 13 illustrates an example of group information. As illustrated in FIG. 13, for example, the group information includes group identification information (group ID), information indicative of the apparatuses belonging to the group and correction information held by the apparatuses (apparatus and correction information), information indicative of the type of the contents projected by the group (content type), information indicative of the layout of the projection screen for the projection of the contents (projection screen layout), information on the projection plane (screen or the like) onto which the contents are projected (projection plane), and the like. As a matter of course, the contents of the group information can be arbitrarily set, and the group information may include only part of the foregoing information or may include information other than the foregoing information.

The projection position control units 222 of the projection imaging apparatuses 101 control the positions of the images projected by the projection units 181 on the basis of the group information, the correction information (information such as various variables used for image correction), and the like (steps S104, S114, and S123).

Figure 14C:
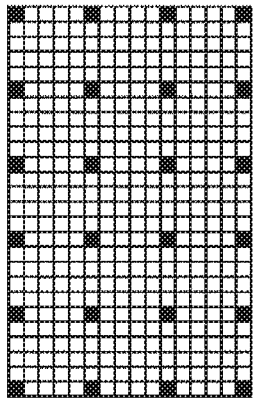
FIGS. 14A, 14B and 14C are diagram describing an example of correction information.
Figure 14B:
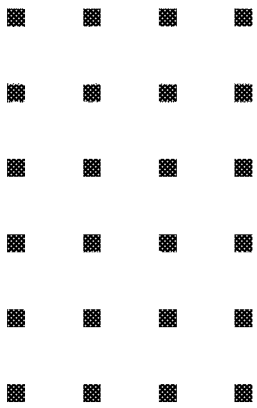
Figure 14A:
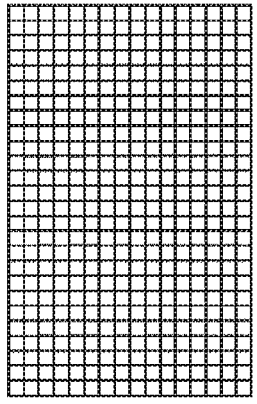

The correction information may be information on individual pixels (indicating how to correct the individual pixels). For example, the correction information may be information on all the pixels of the image to be projected as illustrated in FIG. 14A, or may be information on representative points in the image as illustrated in FIG. 14B. This makes it possible to reduce the amount of the correction information and, for example, reduce the storage capacity necessary for storage in the storage unit 163. In this case, the correction information on the pixels other than the representative points is interpolated on the basis of the correction information on the representative points at the time of image correction (at the time of using the correction information) as illustrated in FIG. 14C.

Figures 15A, 15B:
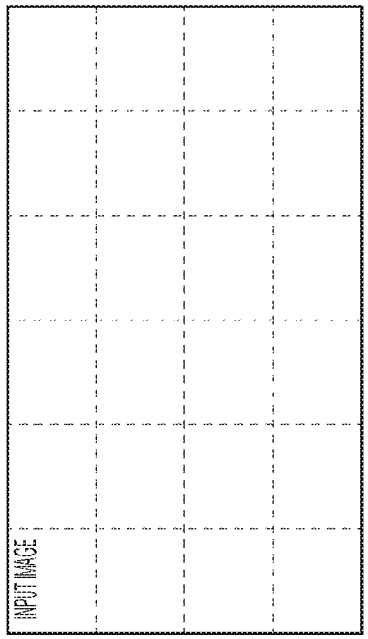
FIG. 15A and FIG. 15B are a diagram describing an example of correction information.

The contents of the correction information can be arbitrarily set but may be geometric information as in the example of FIG. 15A and FIG. 15B, for instance. In the case of the example of FIG. 15A and FIG. 15B, the correction information includes geometric information on the individual representative points in the input image (FIG. 15A) indicating how the representative points will move after the correction (FIG. 15B).

FIG. 16 illustrates a specific example of correction information. The correction information includes various parameters as illustrated in FIG. 16, for example. In the example of FIG. 16, the correction information includes coordinates before and after correction of a target point, gain and shift values of individual colors before and after the correction, and a coefficient of color conversion matrix.

The correction information sharing units 223 of the projection imaging apparatuses 101 share one another's correction information by wireless communications via the communication units 164, for example (steps S105, S115, and S124). In addition, the correction information updating units 224 of the projection imaging apparatuses 101 update the correction information such that the projection imaging apparatuses 101 can project properly projection images in cooperation on the basis of the group information, the projection positions, the correction information, and the like (steps S106, S116, and S125). For example, as in the example of FIG. 2A, the correction information is updated such that one projection image can be formed from a plurality of projection images. In addition, the correction information sharing units 223 of the projection imaging apparatuses 101 share one another's correction information after the correction by wireless communications via the communication units 164, for example (steps S107, S117, and S126).

The projection position control units 222 of the projection imaging apparatuses 101 control the positions of the images projected by the projection units 181 on the basis of the group information, the updated correction information, and the like (steps S108, S118, and S127). Accordingly, the projection positions are in the appropriate state (for example, as in the example of FIG. 2A, one projection image is formed from a plurality of projection images).

When the projection imaging apparatuses 101 project the images in cooperation, the layout of the projection images can be arbitrarily set. FIGS. 17A, 17B, 17C, 17D and 17E illustrates an example.

For example, one entire image 401 formed from four projection images 111 may be projected as illustrated in FIG. 17A, part of the image 401 formed from the three projection images 111 may be projected as illustrated in FIG. 17B, the entire image 401 formed from the three projection images 111 may be projected as illustrated in FIG. 17C, portions of the image 401 formed from the projection images 111 may be projected (without overlapping) as illustrated in FIG. 17D, or the entire image 401 formed from the two projection images 111, and images 402 and 403 formed from two other projection images 111 may be projected as illustrated FIG. 17E. That is, the projected contents data may include a plurality of images.

Incidentally, in such control of the projection positions, when the movement of the projection positions requires the user operation (such as the movement of the projection imaging apparatuses 101) because the positions of the projection images are far distant from one another or the like, for example, the projection position control unit 222 may provide indications for guiding in moving the projection images (guiding indications) together with the projection images or the like.

Figure 18A:
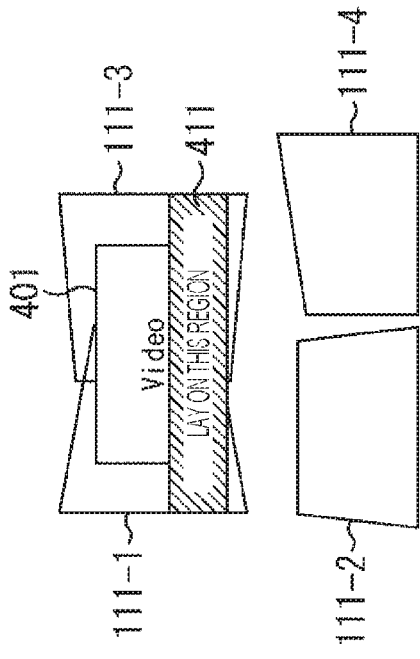
FIGS. 18A, 18B, 18C and 18D are a diagram describing an example of projection position control.

For example, the image 401 is projected onto a region formed by a projection image 111-1 and a projection image 111-3 as illustrated in FIG. 18A. Adding a projection image 111-2 and a projection image 111-4 to this region can display the image 401 in a larger size as illustrated in FIG. 18D.

Figure 18B:
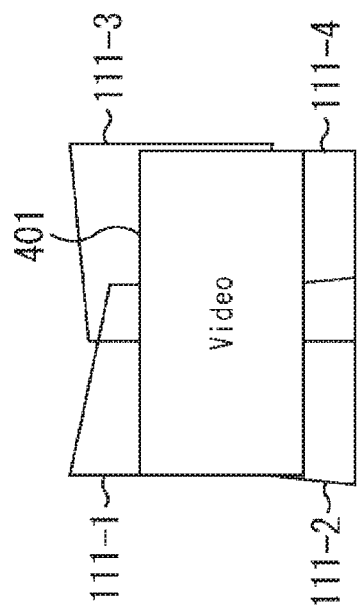

In this case, the projection position control unit 222 may display a message saying "lay on this region" or the like, for example, in the region formed by the projection images 111-1 and 111-3 as illustrated in FIG. 18B. Accordingly, the user can recognize more easily how to move the projection images 111-2 and 111-4.

Figure 18C:
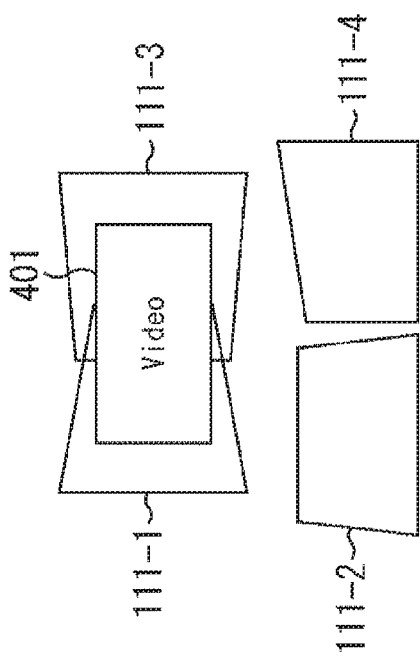
Figure 18D:
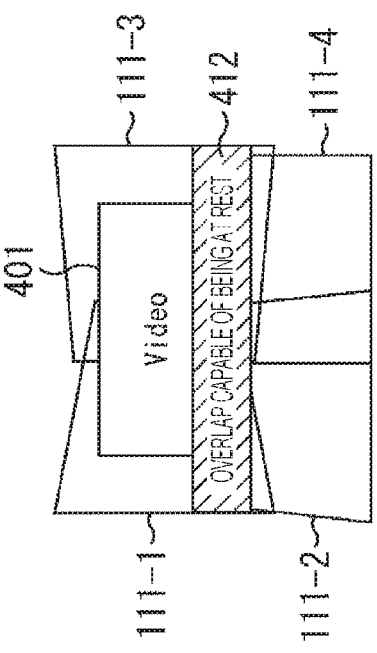

In addition, when the projection images 111-2 and 111-4 are moved in accordance with the guiding indication, the projection position control unit 222 may display a message saying "correctable overlap" or the like in the region formed by the projection images 111-1 to 111-4 as illustrated in FIG. 18C, for example. Accordingly, the user can recognize more easily that the projection images 111 are in the appropriate positions.

Incidentally, in the case where the plurality of projection imaging apparatuses 101 project images in cooperation, the projection images 111 may not be laid out such that the projection images overlap and form one region as in the example of FIG. 17A. For example, the projection imaging apparatuses 101 may project the images so as not to overlap, thereby displaying a plurality of images in cooperation as illustrated in FIG. 17E.

Therefore, the projection positions may be controlled not only such that a plurality of projection images is moved to overlap as in the example of FIGS. 18A, 18B, 18C and 18D but also such that the projection images overlapping and forming one region as illustrated in FIG. 19A are moved so as not to overlap as illustrated in FIG. 19B. Accordingly, the images 401 to 403 can be displayed simultaneously as illustrated in FIG. 19C.

The group information updating units 225 of the projection imaging apparatuses 101 update the group information by the use of the updated correction information and the like. Then, the group information sharing units 226 of the projection imaging apparatuses 101 share the updated group information among the projection imaging apparatuses 101-1 to 101-4 by wireless communications via the communication units 164, for example (steps S109, S119, and S128).

In such a manner as described above, a new group is formed. Accordingly, it is easy to form a group and allow the plurality of projection units to project the images in cooperation.

The manner of projecting the images, for example, the layout of the images, the projection sizes of the images, and the like may be determined by the user or the like deciding the positions of the projection images or may be determined by the contents (metadata of the contents), for example.

Figure 21A:
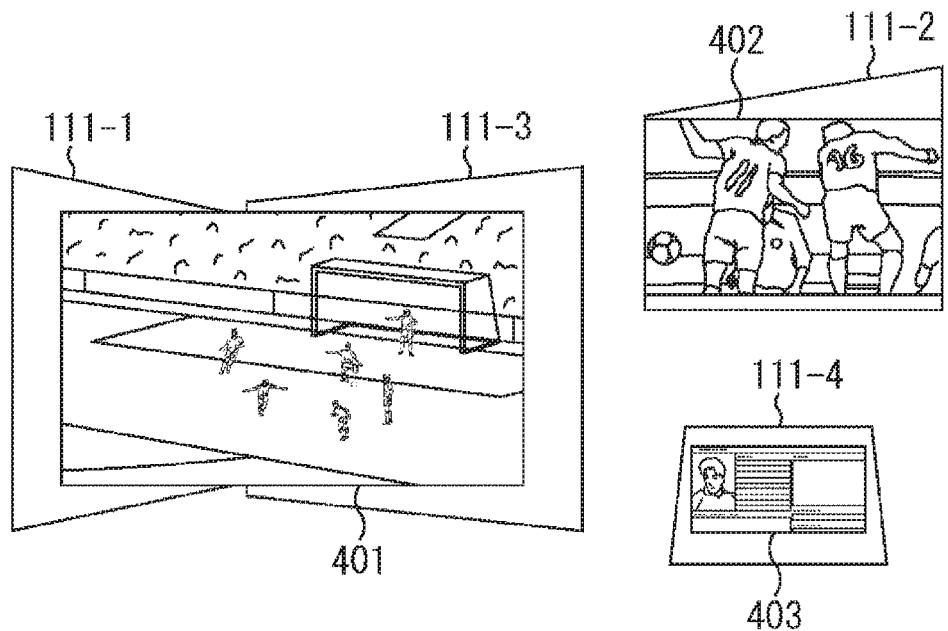
FIGS. 21A and 21B are a diagram describing an example of image projection.

For example, as illustrated in FIG. 21A, in the case where the contents are a soccer game, the contents may be composed of a down shot of a field (image 401), a close-up of players (image 402), data on players (image 403), and the like. The metadata of the contents contains information on the individual images (content name, genre, recommended size, type, size, and the like) as illustrated in FIG. 22.

In this case, on the basis of the metadata of the contents, one large region may be formed from two projection images 111 to project the down shot of the field (image 401) in a large size, and the close-up of players (image 402) and the data on players (image 403) not to be projected in so large sizes may be formed from one each projection image 111.

Alternatively, on the basis of the layout of the projection images 111 set by the user or the like, the down shot of the field (image 401) may be projected in a large size onto the largest region formed from the projection images 111-1 and 111-3, and the close-up of players (image 402) and the data on players (image 403) may be projected onto the two remaining regions.

Figure 21B:
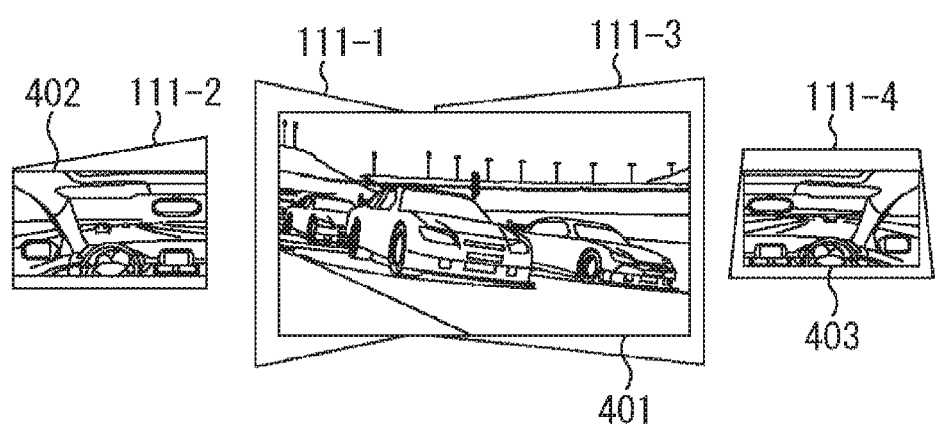

FIG. 21B illustrates the case in which the contents are a car race game. This case is similar to the case of a soccer game.

The image seen from the outside of a racing car and the images seen from the driver's eyes in the individual racing cars may be controlled to be projected onto regions of appropriate sizes and in appropriate positions on the basis of the metadata of the contents or the positions of the projection images.

<Flows of Image Correction Process>

Next, an example of flows of processes for projecting images will be explained with reference to the flowchart of FIG. 20. FIG. 12 illustrates the example of flows of processes in which the projection imaging apparatuses 101-1 to 101-4 form a group and the projection imaging apparatuses 101 project images in cooperation.

In accordance with a request from the projection imaging apparatuses 101 or the like, for example, the contents provision server 105 supplies requested contents data to the projection imaging apparatuses 101 via the communication unit 314 (step S181). The projection imaging apparatuses 101 receive the contents data by wireless communications via the communication units 164, for example (steps S151, S161, and S171).

The image cutout units 227 of the projection imaging apparatuses 101 cut out partial images in regions assigned thereto from the image included in the contents data as necessary on the basis of the group information, the metadata included in the contents data, and the like (steps S152, S162, and S172). These steps are omitted when the projection imaging apparatuses 101 project the entire image.

The image correction units 228 of the projection imaging apparatuses 101 correct the cutout images on the basis of the metadata, the group information, the correction information, and the like (steps S153, S163, and S173).

The image projection control units 229 of the projection imaging apparatuses 101 control the projection units 181 to project the corrected images onto the screen 102 or the like (steps S154, S164, and S174).

As described above, each of the projection imaging apparatuses 101 can project more easily the images in cooperation with the other projection imaging apparatuses 101 by the use of the group information, the correction information, the metadata, and the like.

<Flows of Processes for Group Separation>

Figure 23:
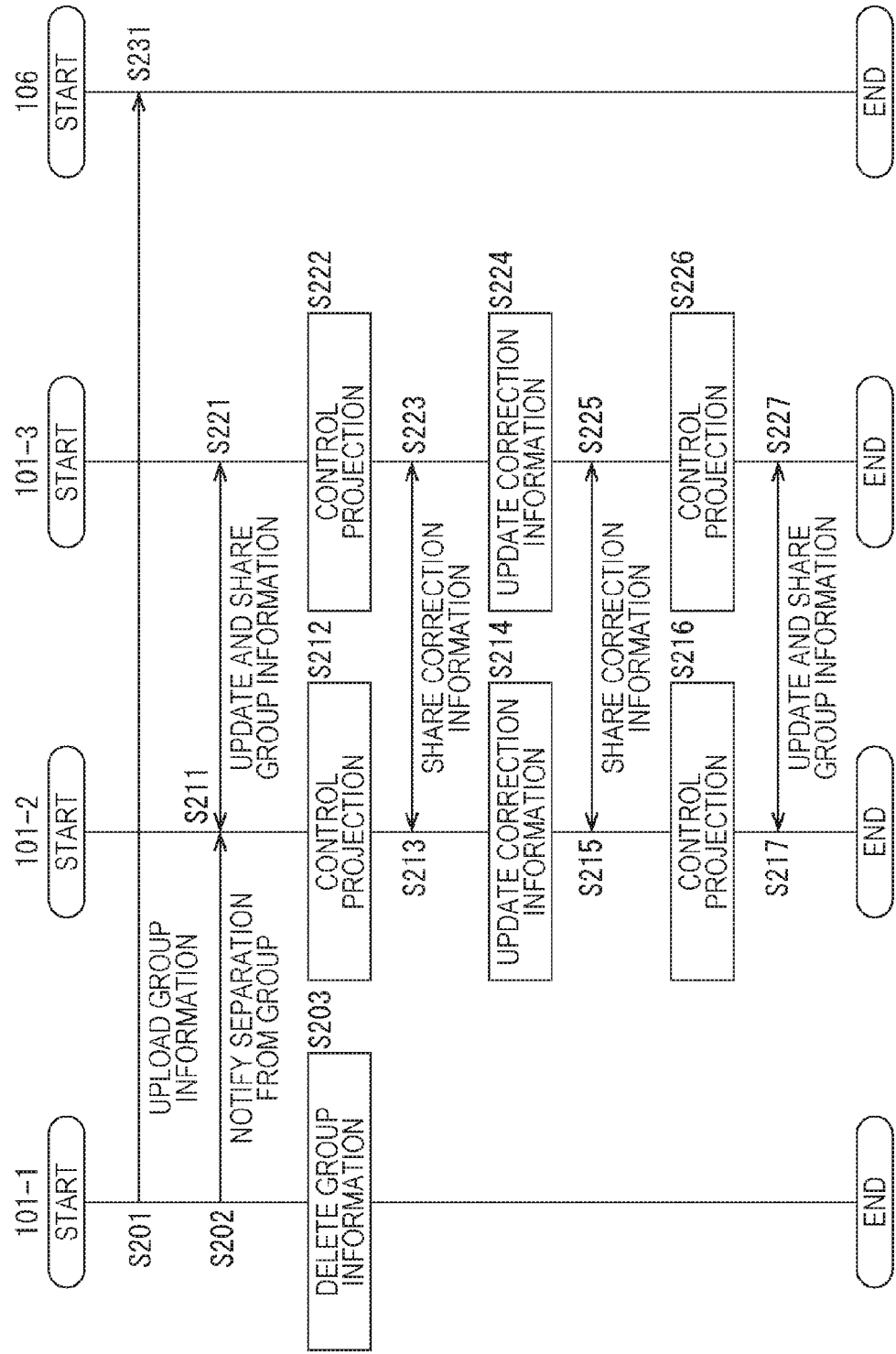
FIG. 23 is a flowchart describing an example of processes for group separation.

Next, an example of flows of processes for group separation will be explained with reference to the flowchart of FIG. 23. FIG. 23 illustrates the example of flows of processes in which the projection imaging apparatuses 101-1 to 101-4 form a group and the projection imaging apparatus 101-1 is separating from the group.

For example, the group separation unit 230 of the projection imaging apparatus 101-1 separating from the group uploads the current group information to the group information management server 106 by wireless communications via the communication unit 164, for example (step S201). The group information management server 106 stores and manages the group information as a history (step S231).

The group separation unit 230 of the projection imaging apparatus 101-1 notifies the separation from the group to another projection imaging apparatus 101 in the same group (at least one of the projection imaging apparatuses 101-2 to 101-4) by wireless communications via the communication unit 164, for example (step S202).

Upon receipt of the notification, the group information updating unit 225 of at least one of the projection imaging apparatuses 101-2 to 101-4 updates the group information to exclude the projection imaging apparatus 101-1. Then, the group information sharing units 226 of the projection imaging apparatuses 101-2 to 101-4 share the updated group information (steps S211 and S221).

The group separation unit 230 of the projection imaging apparatus 101-1 having separated from the group deletes the group information on the group from the group information storage unit 241 (step S203).

In addition, the projection position control units 222 of the projection imaging apparatuses 101-2 to 101-4 remaining in the group control the projection such that these projection imaging apparatuses cooperate with one another as the group excluding the projection imaging apparatus 101-1 (steps S212 and S222).

The correction information sharing units 223 of the projection imaging apparatuses 101-2 to 101-4 share one another's correction information by wireless communications via the communication units 164, for example (steps S213 and S223). In addition, the correction information updating units 224 of the projection imaging apparatuses 101-2 to 101-4 update the correction information such that the projection imaging apparatuses 101-2 to 101-4 can project properly the projection images in cooperation on the basis of the group information, the projection positions, the correction information, and the like (steps S214 and S224). In addition, the correction information sharing units 223 of the projection imaging apparatuses 101-2 to 101-4 share one another's corrected correction information by wireless communications via the communication units 164, for example (steps S215 and S225).

The projection position control units 222 of the projection imaging apparatuses 101-2 to 101-4 control the positions of the images projected by the projection units 181 on the basis of the group information, the updated correction information, and the like (steps S216 and S226). Accordingly, the projection positions are brought into the proper states.

The group information updating units 225 of the projection imaging apparatuses 101-2 to 101-4 update the group information by the use of the updated correction information and the like. In addition, the group information sharing units 226 of the projection imaging apparatuses 101-2 to 101-4 share the updated group information among the projection imaging apparatuses 101-2 to 101-4 by wireless communications via the communication units 164, for example (steps S217 and S227).

In such a manner as described above, the projection imaging apparatus 101 can easily separate from the group. This makes easier to allow the projection imaging apparatuses to form a group and the plurality of projection units to project the images in cooperation.

<Projection Imaging Apparatus>

FIG. 7 is a block diagram illustrating a main configuration example of the projection imaging apparatus 101. However, the configuration example of the projection imaging apparatus 101 is not limited to this. For instance, the projection imaging apparatus 101 may be configured as in the example of FIG. 24.

Figure 24:
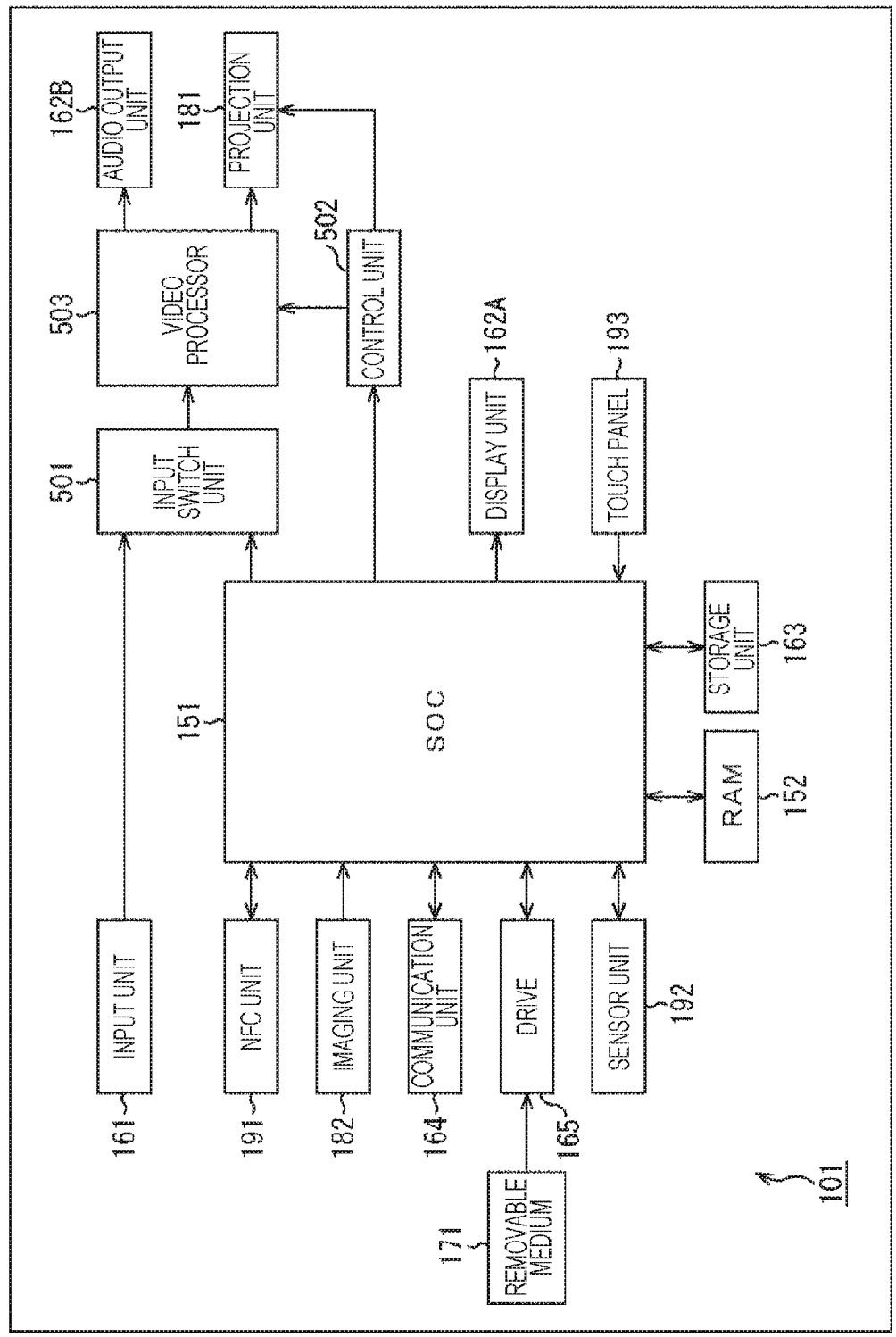
FIG. 24 is a block diagram illustrating a main configuration example of the projection imaging apparatus.

In the case of FIG. 24, the projection imaging apparatuses 101 perform processes on the image to be projected (for example, image cutout, image correction, and the like) by a video processor 503. The image (a video stream or the like) input via an input unit 161 (an HDMI cable or the like) is supplied to the video processor 503 via an input switch unit 501. In addition, the image (an image file or the like) acquired via the communication unit 164 is supplied to the video processor 503 from an SOC 151 via the input switch unit 501.

The SOC 151 controls the video processor 503 and the projection unit 181 via a control unit 502 to perform image processing, image output (projection), audio output, and the like. The processes to be executed are similar to those in the case of the configuration of FIG. 7. However, in the case of the configuration of FIG. 24, the video processor 503 performs the image processing and the like to reduce a burden on the SOC 151.

<Another Configuration of the Projection Imaging System>

Figure 25:
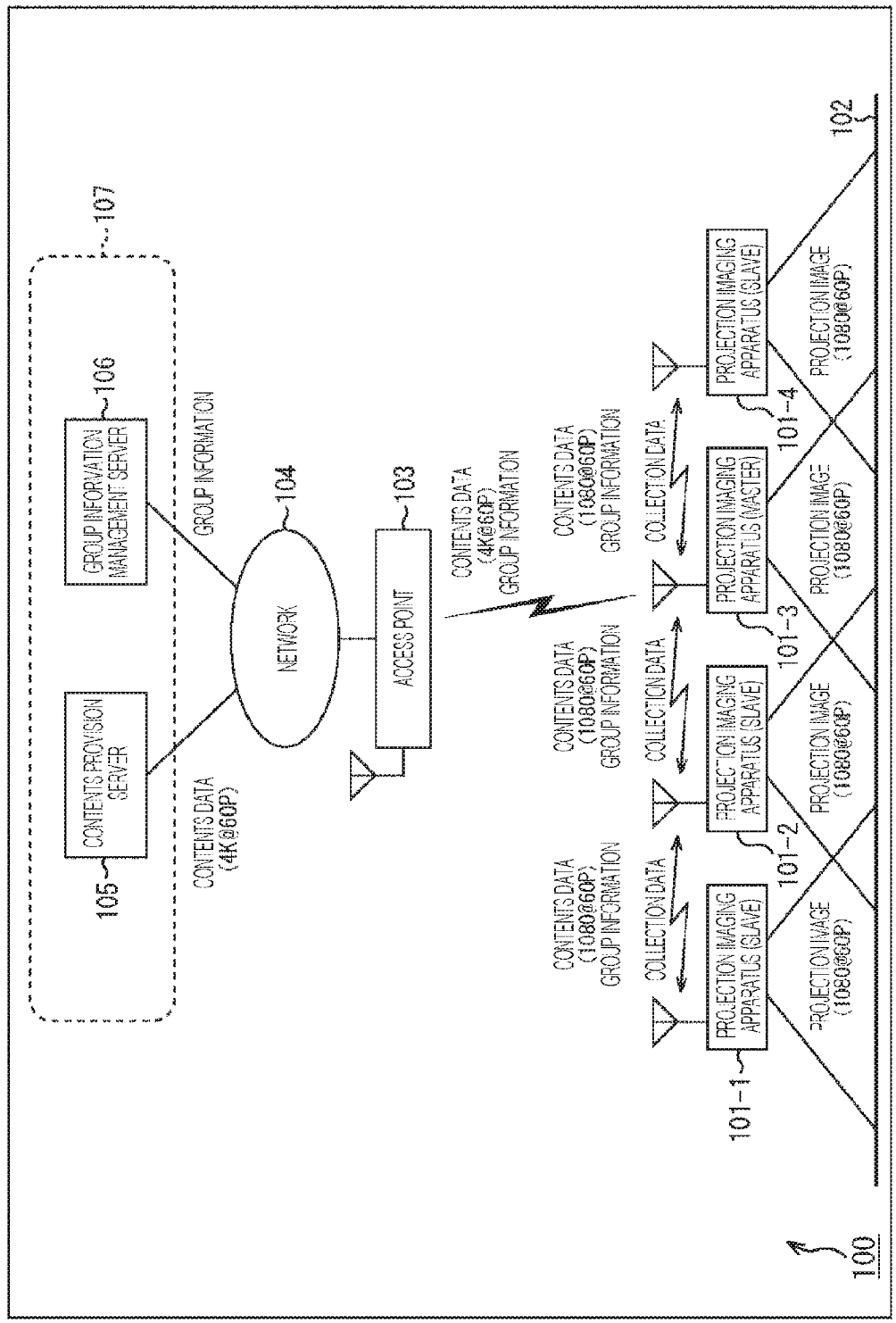
FIG. 25 is a diagram illustrating another configuration example of projection imaging system.

FIG. 1 illustrates a configuration example of the projection imaging system 100 but the configuration example of the projection imaging system 100 is not limited to this. For example, as illustrated in FIG. 25, any one of the projection imaging apparatuses 101 may be set as master and the other projection imaging apparatuses 101 as slaves such that the projection imaging apparatus 101 as master executes the various processes described above such as group management, correction information management, and image processing, and the projection imaging apparatuses 101 as slaves merely receive and project the corrected images.

Accordingly, only the projection imaging apparatus 101 as master needs to have sufficient processing ability, which reduces the required processing ability of the other projection imaging apparatuses 101 (as slaves). Therefore, it is possible to achieve cost reduction. In this manner, the projection imaging system 100 may be composed of the projection imaging apparatuses 101 different in processing ability.

Figure 26:
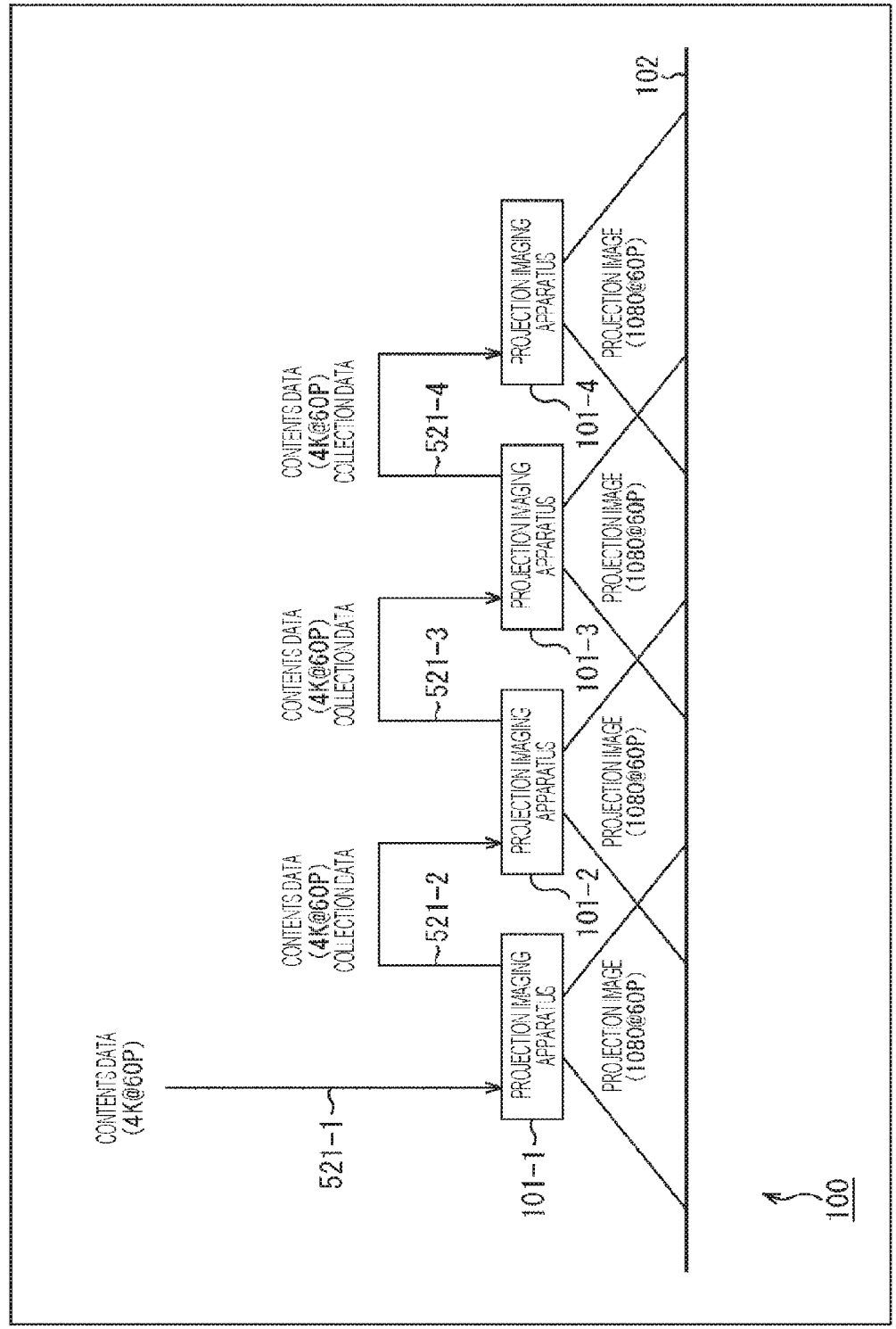
FIG. 26 is a diagram illustrating still another configuration example of projection imaging system.

In addition, the projection imaging apparatuses 101 may communicate with one another in a wired manner. For example, as illustrated in FIG. 26, the projection imaging apparatuses 101 may be connected together via communication cables 521 (communication cables 521-1 to 521-4) such as HDMI cables. For example, in the case of using HDMI cables as the communication cables 521, it is possible to transmit not only the contents data but also collection data such as sensor data and correction information via the communication cables 521.

Figures 27A, 27B:
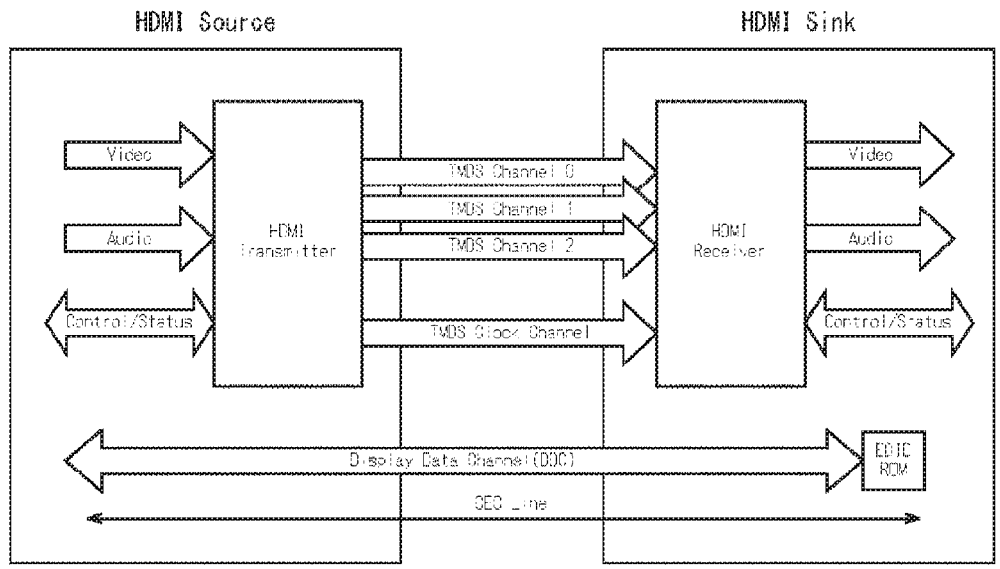
FIGS. 27A and 27B are a diagram describing specifications on HDMI (registered trademark).

The HDMI cables include a consumer electronic control (CEC) line as illustrated in FIG. 27A. The CEC line of the HDMI cables is generally used for communications of command groups and the like operated by a remote control such as instructions for power on/off between connected devices and instructions for replay/stop of running systems. Using the table as illustrated in FIG. 27B also allows other data communications. That is, it is possible to transmit collection data and the like by the use of the CEC.

Figure 28:
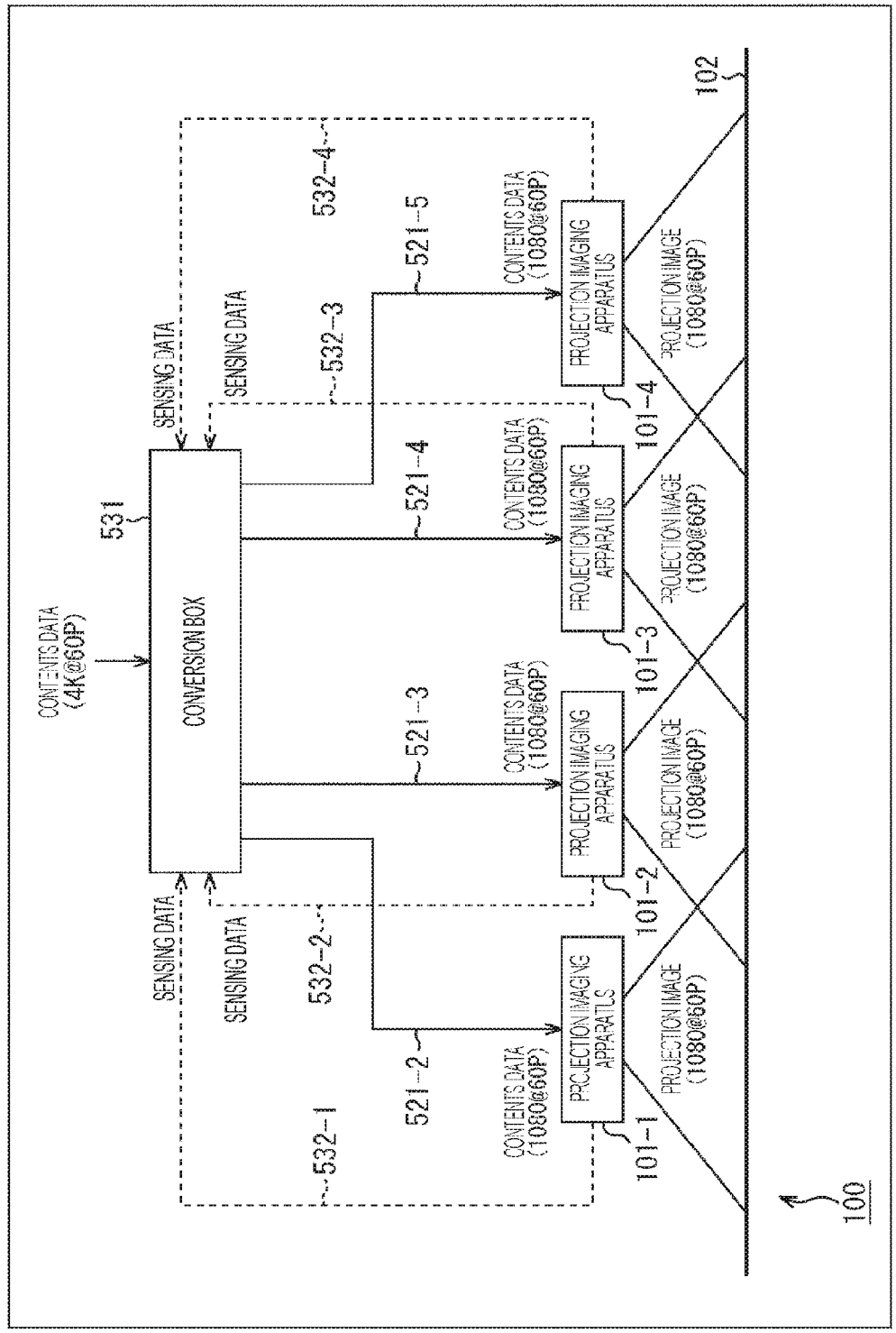
FIG. 28 is a diagram illustrating still another configuration example of projection imaging system.

In addition, in the case of connecting the projection imaging apparatuses 101 via the communication cables, the projection imaging apparatuses 101 may be connected in a daisy chain mode as in the example of FIG. 26. Alternatively, the projection imaging apparatuses 101 may be connected by the use of a conversion box 531 as illustrated in FIG. 28. In this case, image processing such as image cutout and correction may be performed in the conversion box 531. In this case, sensing data obtained by the projection imaging apparatuses 101 may be collected by the conversion box 531 (dot-line arrows 532-1 to 532-4). The sensing data may be collected by the use of the communication cables 521 as described above, or may be collected by new communication cables other than the communication cables 521, or may be collected by wireless communications.

Figure 29:
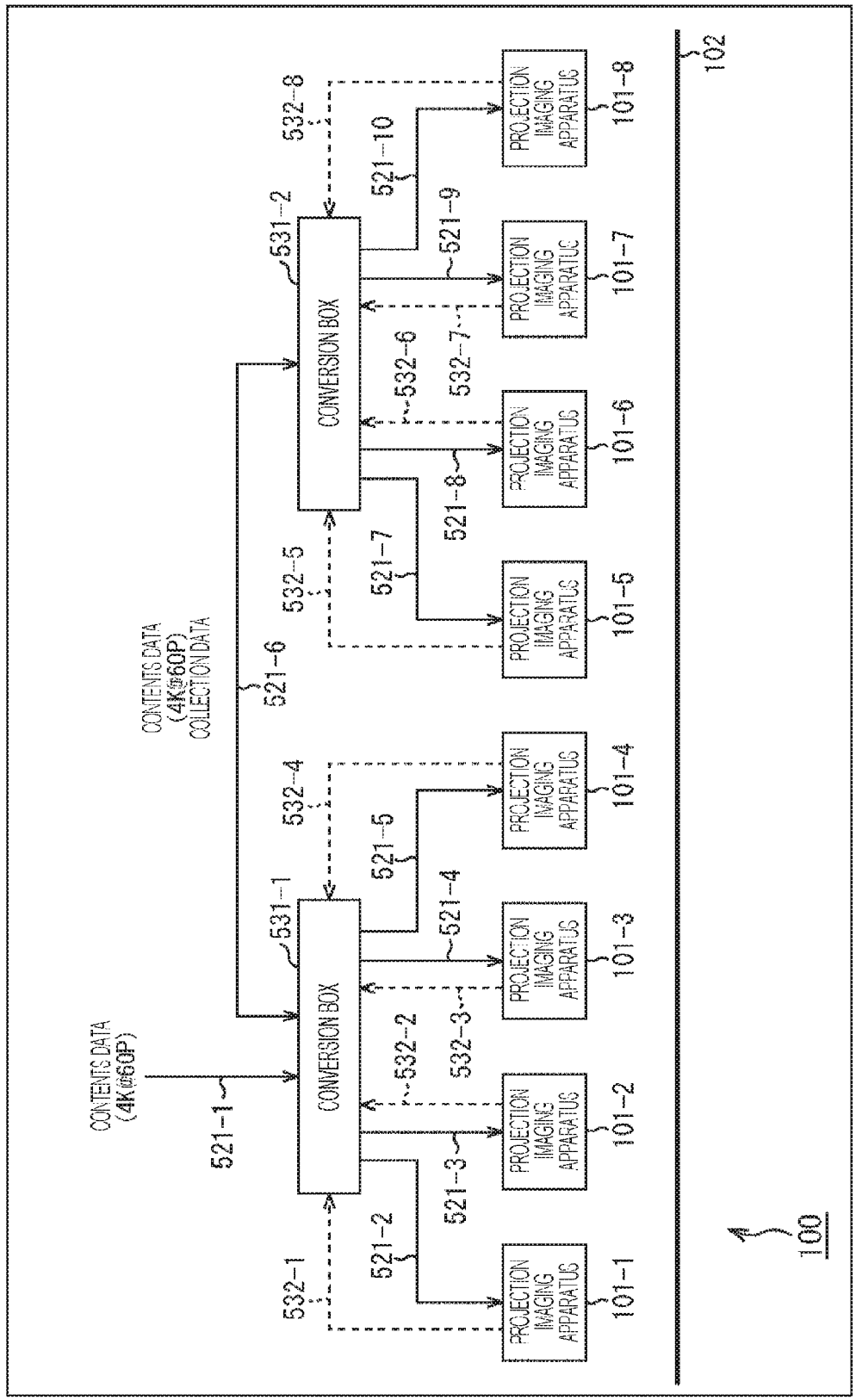
FIG. 29 is a diagram illustrating still another configuration example of projection imaging system.

The number of the projection imaging apparatuses 101 connected to the conversion box 531 can be arbitrarily set in theory. In actuality, however, the existing conversion boxes are all capable of connecting only several projection imaging apparatuses 101. Nevertheless, a plurality of conversion boxes 531 may be connected to group a larger number of projection imaging apparatuses 101 as illustrated in FIG. 29.

The conversion boxes 531 may be connected via the communication cables 521, any other communication cables, wireless communications, or the like.

Figure 30:
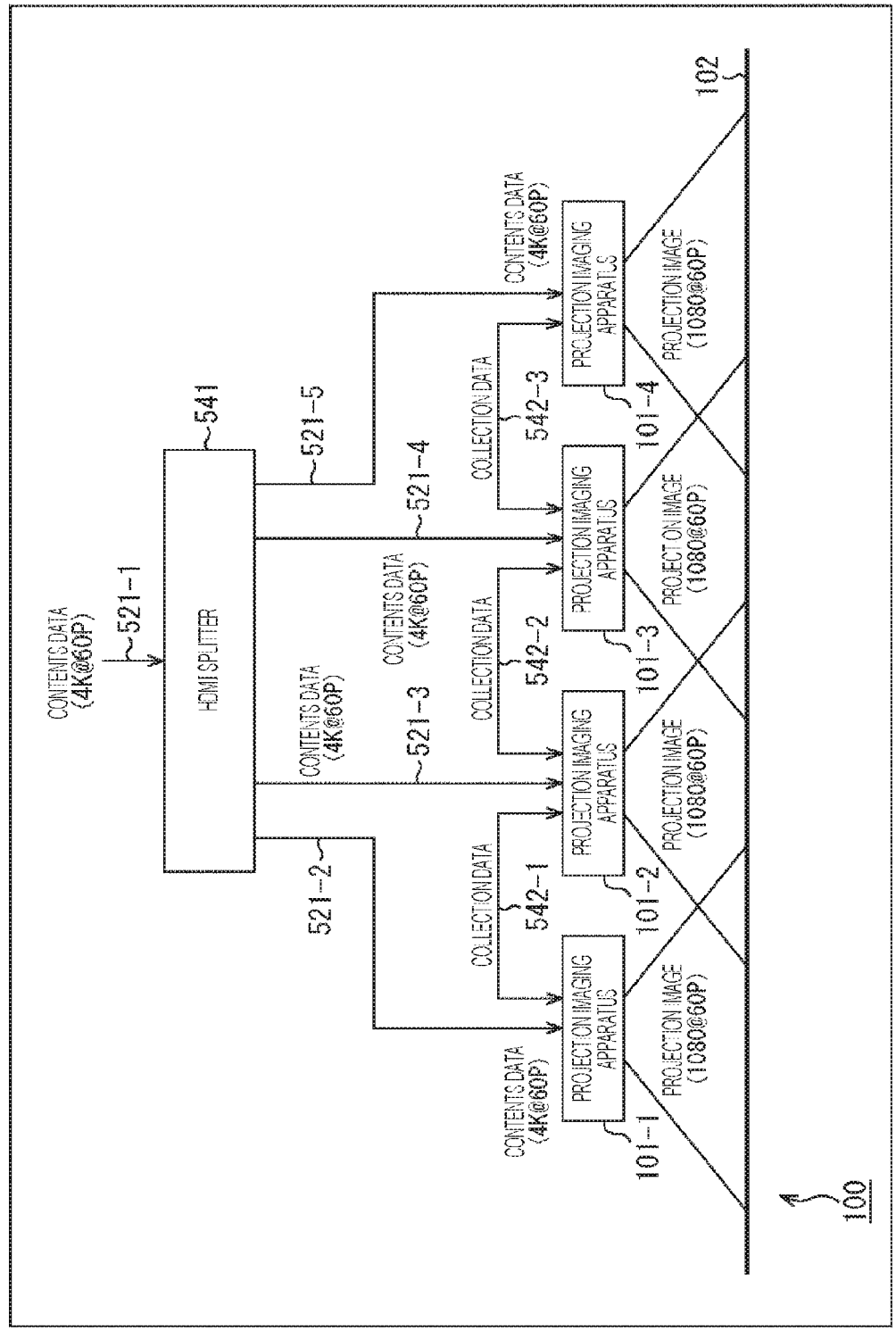
FIG. 30 is a diagram illustrating still another configuration example of projection imaging system.

Instead of the conversion boxes 531, an HDMI splitter 541 may be used as illustrated in FIG. 30. The HDMI splitter 541 simply branches the input contents data and supplies the same to the plurality of projection imaging apparatuses 101. Therefore, in this case, various processes such as image processing, and management and control of the group information and the correction information are performed in the projection imaging apparatuses 101 as in the case of FIG. 1. The collection data may be shared among the projection imaging apparatuses 101 via communication cables 542, wireless communications, or the like.

The series of processes described above may be executed by hardware or software. In the case of executing the series of processes described above by software, programs constituting the software are installed from a network or a recording medium.

The recording medium is composed of the removable medium 171 or the removable medium 321 recording the programs to be distributed to the users for delivery of the programs separately from the apparatus itself as illustrated in FIG. 7 or 11, for example. The removable medium 171 and the removable medium 321 include magnetic discs (including flexible discs) and optical disc (CD-ROMs and DVDs). Further, the removable medium 171 and the removable medium 321 also include magneto-optical mini discs (MDs), semiconductor memory discs, and the like.

In that case, in the projection imaging apparatus 101, for example, the programs can be installed into the storage unit 163 by attaching the removable medium 171 to the drive 165. In addition, in the contents provision server 105, for example, the programs can be installed into the storage unit 313 by attaching the removable medium 321 to the drive 315.

In addition, the programs can also be provided via a wired or wireless transmission medium such as a local area network, the Internet, or digital satellite broadcasting. In that case, in the projection imaging apparatus 101, for example, the programs can be received by the communication unit 164 and installed into the storage unit 163. In addition, in the contents provision server 105, for example, the programs can be received by the communication unit 314 and installed into the storage unit 313.

Besides, the programs can also be installed in advance in a recording unit, a ROM, or the like. In the projection imaging apparatus 101, for example, the programs can be installed in advance in the storage unit 163 or the ROM of the SOC 151. In addition, in the contents provision server 105, for example, the programs can be installed in advance in the storage unit 313, the ROM 302, or the like.

Incidentally, the programs to be executed by the computer may be programs to be processed in time series in accordance with the sequence explained herein or may be programs to be processed in parallel or at necessary timing such as upon receipt of an invocation.

In addition, the steps describing the programs to be recorded in a recording medium explained herein include not only processes performed in time series in accordance with the described sequence but also processes that are not necessarily performed in time series but are executed in parallel or individually.

In addition, the steps described above can be performed in the apparatuses described above or any apparatus other than the apparatuses described above. In that case, the apparatuses to perform the steps have functions necessary for performing the steps (functional blocks or the like). In addition, the information necessary for performing the steps is transmitted as appropriate to the apparatuses.

In addition, the system explained herein refers to an assembly of constituent elements (apparatuses, modules (components), and the like). However, all of the constituent elements may not necessarily be in the same housing. Therefore, the system may be composed of a plurality of apparatuses stored in separate housings and connected via a network or one apparatus with a plurality of modules stored in one housing.

In addition, a configuration explained above as one apparatus (or one processing unit) may be divided into a plurality of apparatuses (or a plurality of processing units). Conversely, a plurality of apparatuses (or a plurality of processing units) explained above may be collectively configured as one apparatus (or one processing unit). In addition, as a matter of course, any component other than those described above may be added to the apparatuses (or the processing units). Further, some components of an apparatus (or a processing unit) may be included in another apparatus (or another processing unit) as far as the entire system is configured and operated in substantially the same manner.

Preferred embodiments of the present disclosure have been explained so far in detail with reference to the attached drawings. However, the technical scope of the present disclosure is not limited to the foregoing examples. Apparently, those with general knowledge in the technical field of the present disclosure could conceive various alternation or modification examples within the scope of the technical idea described in the claims, and these examples are naturally considered to fall within the technical scope of the present disclosure.

For example, the present technology can be configured as a cloud computing system in which one function is shared among a plurality of apparatuses via a network and is performed in coordination with one another.

In addition, the steps explained in the foregoing flowcharts may be executed by one apparatus or may be shared and performed by a plurality of apparatuses.

Further, when one step includes a plurality of processes, the plurality of processes included in the one step may be executed by one apparatus or may be shared and executed by a plurality of apparatuses.

In addition, the present technology is not limited to the foregoing one but may be implemented as any component mounted in such an apparatus or apparatuses constituting a system, for example, a processor as a system large scale integration (LSI), a module using a plurality of processors, a unit using a plurality of modules, a set with still other functions added to the unit (that is, part of the apparatus), or the like.

Incidentally, the present technology can also be configured as follows:

(1)

An information processing apparatus including:

a group formation unit that forms a group for projecting one contents data in cooperation with other information processing apparatuses including projection units to project images and imaging units to shoot a subject and obtain shot images;

a correction information sharing unit that shares correction information as information relating to correction made to the images projected by the projection units of the information processing apparatuses belonging to the group formed by the group formation unit among the information processing apparatuses belonging to the group formed by the group formation unit; and a correction information updating unit that updates the correction information for the subject information processing apparatus on the basis of the shot image obtained by shooting the image projected by the projection unit as a subject and the correction information shared by the correction information sharing unit.

(2)

The information processing apparatus according to (1), wherein the correction information includes information relating to correction made to predetermined representative pixels in the image.

(3)

The information processing apparatus according to (2), wherein the information relating to correction made to the representative pixels includes coordinates before and after the correction of the representative pixels, the gain and shift values of respective color components of the representative pixels, and a coefficient of color conversion matrix of the representative pixels.

(4)

The information processing apparatus according to any of (1) to (3), further including a wireless communication unit that performs wireless communications, wherein the group formation unit forms the group including other information processing apparatuses with which wireless communications were performed by the wireless communication unit and the subject information processing apparatus.

(5)

The information processing apparatus according to any of (1) to (3), wherein the group formation unit forms the group including other information processing apparatuses connected to the subject information processing apparatus via predetermined communication cables and the subject information processing apparatus.

(6)

The information processing apparatus according to any of (1) to (5), wherein the group formation unit generates group information as information relating to the formed group.

(7)

The information processing apparatus according to (6), wherein the group information includes identification information for identifying the group and the correction information for the information processing apparatuses constituting the group corresponding to the group information.

(8)

The information processing apparatus according to (7), wherein the group information further includes information relating to the kinds of contents data that were projected by the group in the past.

(9)

The information processing apparatus according to (8), wherein the group information further includes the layout of the images projected by the projection units of the information processing apparatuses belonging to the group at the time of projection of the contents data.

(10)

The information processing apparatus according to (9), wherein the group information further includes information relating to a projection plane onto which the images were projected.

(11)

The information processing apparatus according to (9) and (10), further including:

a group information sharing unit that allows the group information to be shared among the information processing apparatuses belonging to the group; and a group information updating unit that updates the group information.

(12)

The information processing apparatus according to any of (6) to (11), further including a projection position control unit that controls the projection position of the image projected by the projection unit on the basis of the group information and the correction information.

(13)

The information processing apparatus according to (12), wherein, when the positions of the images projected by the projection units of the information processing apparatuses belonging to the group are different from positions decided on the basis of the group information and the correction information, the projection position control unit projects guiding images such that the images can be projected into the positions.

(14)

The information processing apparatus according to any of (6) to (13), further including an image cutout unit that cuts out a portion of the image included in the contents data to be projected by the projection unit on the basis of the group information.

(15)

The information processing apparatus according to any of (6) to (14), further including an image correction unit that corrects the portion of the image included in the contents data to be projected by the projection unit on the basis of the group information.

(16)

The information processing apparatus according to any of (1) to (15), further including a group separation unit that separates from the group formed by the group formation unit after notifying the separation from the group to the other information processing apparatuses belonging to the group.

(17)

The information processing apparatus according to any of (1) to (16), wherein the contents data includes image data and metadata.

(18)

The information processing apparatus according to (17), wherein the metadata includes information relating to the contents of the image data, genre, recommended projection image size, type, and resolution.

(19)

The information processing apparatus according to (17) or (18), wherein the contents data has a plurality of image data.

(20)

An information processing method including:

forming a group for projecting one contents data in cooperation with other information processing apparatuses including projection units to project images and imaging units to shoot a subject and obtain shot images;

sharing correction information as information relating to correction made to the images projected by the projection units of the information processing apparatuses belonging to the formed group among the information processing apparatuses belonging to the formed group; and updating the correction information for the subject information processing apparatus on the basis of the shot image obtained by shooting the image projected by the projection unit as a subject and the shared correction information.

REFERENCE SIGNS LIST

100 Projection imaging system
101 Projection imaging apparatus
102 Screen
103 Access point
104 Network
105 Contents provision server
106 Group information management server
107 Server
111 Projection image
112 Input image
151 SOC
163 Storage unit
181 Projection unit
182 Imaging unit
201 Video processor
202 Laser driver 203 Laser output unit
204 Mirror
205 MEMS driver
206 MEMS mirror
221 Group formation unit
222 Projection position control unit
223 Correction information sharing unit
224 Correction information updating unit
225 Group information updating unit
226 Group information sharing unit
227 Image cutout unit
228 Image correction unit
229 Image projection control unit
230 Group separation unit
241 Group information storage unit
242 Correction information storage unit
243 Sensor data storage unit
301 CPU
501 Input switch unit
502 Control unit
503 Video processor
521 HDMI cable
531 Conversion box
541 HDMI splitter

The invention claimed is:

1. A first information processing apparatus, comprising:
a group formation unit configured to form a group to project contents data in cooperation with a plurality of second information processing apparatuses;
first projection unit configured to project first image;
first imaging unit configured to shoot a subject and obtain a shot image,
wherein the plurality of second information processing apparatuses includes a plurality of second projection units and a plurality of second imaging units;
a correction information sharing unit configured to share correction information among the plurality of second information processing apparatuses that belong to the group,
wherein the correction information relates to correction made to the first image projected by the first projection unit and a plurality of second images projected by the plurality of second projection units of the plurality of second information processing apparatuses that belong to the group formed by the group formation unit,
wherein the correction information comprises a coefficient of color conversion matrix of representative pixels in the first image; and
a correction information updating unit configured to update the correction information for the first information processing apparatus based on the shot image obtained by shooting the first image projected by the first projection unit as the subject and the correction information shared by the correction information sharing unit.

2. The first information processing apparatus according to claim 1, wherein the correction information relates to correction made to the representative pixels in the first image.

3. The first information processing apparatus according to claim 2, wherein the correction information that relates to the correction made to the representative pixels further includes coordinates before and after the correction of the representative pixels and gain and shift values of respective color components of the representative pixels.

4. The first information processing apparatus according to claim 1, further comprising:

a wireless communication unit configured to communicate wirelessly,
wherein the group formation unit is further configured to form the group including the plurality of second information processing apparatuses with which the wireless communication unit wirelessly communicated and the first information processing apparatus.

5. The first information processing apparatus according to claim 1, wherein the group formation unit is further configured to form the group including the plurality of second information processing apparatuses connected to the first information processing apparatus via communication cables and the first information processing apparatus.

6. The first information processing apparatus according to claim 1, wherein the group formation unit is further configured to generate group information that relates to the group.

7. The first information processing apparatus according to claim 6, wherein the group information includes identification information that identifies the group and the correction information for the first information processing apparatus and the plurality of second information processing apparatuses constituting the group corresponding to the group information.

8. The first information processing apparatus according to claim 7, wherein the group information further includes kinds of contents data that were projected by the group in the past.

9. The first information processing apparatus according to claim 8, wherein the group information further includes layout of the first image and the plurality of second images projected by the first projection unit and the plurality of second projection units at a time of projection of the contents data.

10. The first information processing apparatus according to claim 9, wherein the group information further includes information that relates to a projection plane onto which the first image and the plurality of second images were projected.

11. The first information processing apparatus according to claim 9, further comprising:
a group information sharing unit configured to share the group information among the plurality of second information processing apparatuses that belong to the group; and
a group information updating unit configured to update the group information.

12. The first information processing apparatus according to claim 6, further comprising:
a projection position control unit configured to control first projection position of the first image projected by the first projection unit based on the group information and the correction information.

13. The first information processing apparatus according to claim 12,
wherein, based on a determination that second positions of the plurality of second images projected by the plurality of second projection units of the plurality of second information processing apparatuses that belong to the group are different from third positions decided based on the group information and the correction information, the projection position control unit is further configured to project guiding images such that, the plurality of second images can be projected into the third positions.

14. The first information processing apparatus according to claim 6, further comprising an image cutout unit configured to cut out a portion of the first image included in the contents data to be projected by the first projection unit based on the group information.

15. The first information processing apparatus according to claim 6, further comprising an image correction unit further configured to correct a portion of the first image included in the contents data to be projected by the first projection unit based on the group information.

16. The first information processing apparatus according to claim 1, further comprising a group separation unit configured to separate the first information processing apparatus from the group after notification of the separation from the group to the plurality of second information processing apparatuses that belong to the group.

17. The first information processing apparatus according to claim 1, wherein the contents data includes image data and metadata.

18. The first information processing apparatus according to claim 17, wherein the metadata includes information that relates to contents of the image data, genre, recommended projection image size, type, and resolution of the contents data.

19. The first information processing apparatus according to claim 17, wherein the contents data has a plurality of image data.

20. An information processing method, comprising:
   in a first information processing apparatus:
      forming a group for projecting contents data in cooperation with a plurality of second information processing apparatuses,
      wherein the first information processing apparatus include a first projection unit configured to project first image and a first imaging unit configured to shoot a subject and obtain a shot image,
      wherein the plurality of second information processing apparatuses includes a plurality of second projection units and a plurality of second imaging units;
      sharing correction information among the plurality of second information processing apparatuses belonging to the group,
      wherein the correction information relates to correction made to the first image, and a plurality of second images projected by the plurality of second projection units of the plurality of second information processing apparatuses belonging to the group, and
      wherein the correction information comprises a coefficient of color conversion matrix of representative pixels in the first image; and
      updating the correction information for the first information processing apparatus based on the shot image obtained by shooting the first image projected by the first projection unit and the correction information.

21. A first information processing apparatus, comprising:
   a group formation unit configured to form a group to project contents data in cooperation with a plurality of second information processing apparatuses;
   first projection unit configured to project first image;
   first imaging unit configured to shoot a subject and obtain a shot image,
   wherein the plurality of second information processing apparatuses includes a plurality of second projection units and a plurality of second imaging units;
   a correction information sharing unit configured to share correction information among the plurality of second information processing apparatuses that belong to the group,
   wherein the correction information relates to correction made to the first image projected by the first projection unit and a plurality of second images projected by the plurality of second projection units of the plurality of second information processing apparatuses that belong to the group formed by the group formation unit,
   wherein the correction information relates to correction made to representative pixels in the first image, and wherein the correction information includes coordinates before and after the correction of the representative pixels, gain and shift values of respective color components of the representative pixels, and a coefficient of color conversion matrix of the representative pixels; and
   a correction information updating unit configured to update the correction information for the first information processing apparatus based on the shot image obtained by shooting the first image projected by the first projection unit as the subject and the correction information shared by the correction information sharing unit.

* * * * *